(12) United States Patent
Sherstyuk et al.

(10) Patent No.: US 9,966,780 B2
(45) Date of Patent: May 8, 2018

(54) EXTENDED LIFE BATTERY

(71) Applicant: Gbatteries Energy Inc., Mountain View, CA (US)

(72) Inventors: Tymofiy Sherstyuk, Ottawa (CA); Mykola Sherstyuk, Ottawa (CA)

(73) Assignee: GBATTERIES ENERGY CANADA INC., Ottawa (CA)

( * ) Notice: Subject to any disclaimer, the term of this patent is extended or adjusted under 35 U.S.C. 154(b) by 405 days.

(21) Appl. No.: 14/386,889

(22) PCT Filed: Mar. 25, 2013

(86) PCT No.: PCT/CA2013/000277
§ 371 (c)(1),
(2) Date: Sep. 22, 2014

(87) PCT Pub. No.: WO2013/142964
PCT Pub. Date: Oct. 3, 2013

(65) Prior Publication Data
US 2015/0048796 A1    Feb. 19, 2015

Related U.S. Application Data

(60) Provisional application No. 61/615,282, filed on Mar. 25, 2012, provisional application No. 61/662,882, (Continued)

(51) Int. Cl.
*H02J 7/00* (2006.01)
*H01M 10/42* (2006.01)
(Continued)

(52) U.S. Cl.
CPC ........... *H02J 7/007* (2013.01); *H01M 10/425* (2013.01); *H01M 10/44* (2013.01); *H01M 10/48* (2013.01);
(Continued)

(58) Field of Classification Search
CPC ...................................................... H02J 7/0021
(Continued)

(56) References Cited

U.S. PATENT DOCUMENTS 3,987,353 A    10/1976 Marcharg
4,016,473 A    4/1977 Newman
(Continued)

FOREIGN PATENT DOCUMENTS

CN    201532995 U    7/2010
CN    201804941 U    4/2011
(Continued)

OTHER PUBLICATIONS

Parthasarathy, Gomadam M. et al., Analysis of Pulse Discharge of a Lithium-Ion Battery, Center for ElectroChemical Engineering, University of South Carolina, https://www.electrochem.org/dl/ma/200/pdfs/0148.pdf.
(Continued)

*Primary Examiner* — Yalkew Fantu
(74) *Attorney, Agent, or Firm* — Fountainhead Law Group P.C.

(57) ABSTRACT

Methods and apparatuses are described for use in preserving and/or recovering the lifetime and charge storage capacity of batteries. The methods include pulse charging, energy juggling, energy leveling, all resulting in extended battery life. Methods of storing batteries for maintaining their capacity at their nominal level for extended periods of time are also presented.

26 Claims, 15 Drawing Sheets

Related U.S. Application Data filed on Jun. 21, 2012, provisional application No. 61/683,691, filed on Aug. 15, 2012.

(51) Int. Cl.
- *H01M 10/44* (2006.01)
- *H01M 10/48* (2006.01)
- *H01M 16/00* (2006.01)

(52) U.S. Cl.
CPC ........... *H02J 7/0021* (2013.01); *H01M 16/00* (2013.01); *H01M 2010/4271* (2013.01)

(58) Field of Classification Search
USPC ........................................................ 320/129
See application file for complete search history.

(56) References Cited

U.S. PATENT DOCUMENTS

| | | | |
|---|---|---|---|
| 4,680,241 A | | 7/1987 | Dyer |
| 4,878,007 A | | 10/1989 | Gaibor et al. |
| 5,500,583 A | | 3/1996 | Buckley et al. |
| 5,504,415 A | | 4/1996 | Podrazhansky et al. |
| 5,701,068 A | * | 12/1997 | Baer ................... B60L 11/1846 320/119 |
| 5,747,189 A | | 5/1998 | Perkins |
| 5,828,201 A | | 10/1998 | Hoffman, Jr. et al. |
| 6,232,750 B1 | | 5/2001 | Podrazhansky et al. |
| 6,452,363 B1 | | 9/2002 | Jabaji |
| 7,570,015 B2 | | 9/2008 | Prakash et al. |
| 8,138,724 B2 | | 12/2008 | Li et al. |
| 8,330,419 B2 | | 12/2012 | Kim et al. |
| 8,427,106 B2 | | 4/2013 | Kim et al. |
| 8,513,921 B2 | | 8/2013 | Berkowitz et al. |
| 8,994,331 B2 | | 3/2015 | Kerfoot, Jr. et al. |
| 2004/0038087 A1 | * | 2/2004 | Shiue ..................... H01M 6/50 429/7 |
| 2006/0092583 A1 | | 5/2006 | Alahmad et al. |
| 2008/0079397 A1 | | 4/2008 | Fee et al. |
| 2010/0164430 A1 | * | 7/2010 | Lu ....................... H01M 10/441 320/103 |
| 2011/0076525 A1 | * | 3/2011 | Zhang ................... H01M 10/42 429/10 |
| 2012/0025756 A1 | * | 2/2012 | Xu ..................... H01M 10/6572 320/103 |
| 2013/0234667 A1 | | 9/2013 | Norton |

FOREIGN PATENT DOCUMENTS

| | | |
|---|---|---|
| JP | 06163081 | 6/1994 |
| WO | 2011132300 A1 | 10/2011 |

OTHER PUBLICATIONS

Li, Jun et al., The effects of pulse charging on cycling characteristics of commercial lithium-ion batteries, Journal of Power Sources (2001) pp. 302-309, v. 102, School of Chemical Engineering, Georgia Institute of Technology.

Mino, Rihito et al., A Pulsed Discharge Control of Battery, TENCON 2006. 2006 IEEE Region 10 Conference, pp. 1-4, Graduate School of Engineering, Osaka University.

Chiasserini, Carla F. et al, A Model for Battery Pulsed Discharge with Recovery Effect, Wireless Communications and Networking Conference, 1999. WCNC. 1999 IEEE , pp. 636-639, vol. 2, Department of Electrical and Computer Engineering, University of California San Diego.

Chiasserini, Carla F. et al, Pulsed Battery Discharge in Communication Devices, Proceeding MobiCom '99 Proceedings of the 5th annual ACM/IEEE international conference on Mobile computing and networking, pp. 88-95, Department of Electrical and Computer Engineering, University of California San Diego.

Lafollette, R. M., Design and performance of high specific power, pulsed discharge, bipolar lead acid batteries; 10th Annual Battery Conference on Applications and Advances, Long Beach, pp. 43-47.

Lafollette, R. M. et al, Design fundamentals of high power density, pulsed discharge, lead-acid batteries. II Modeling; J. Elec-trochem. Soc., vol. 137, pp. 3701-3707.

Fuller, T.F. et al, Relaxation phenomena in lithium-ion-insertion cells, J. Electrochem. Soc., vol. 141, pp. 982-990.

Nelson, B. et al, Ultrafast pulse discharge and recharge capabilities of thin-metal film battery technology, 12th Annual Battery Conference on Applications and Advances, Long Beach, pp. 139-143, Jan. 1997.

Nelson, B., TMF ultra-high rate discharge performance, 12th Annual Battery Conference on Applications and Advances, Long Beach, pp. 139-143, Jan. 1997.

Chiasserini, Carla F. et al, Pulsed battery discharge in communication devices, Proc. of Mobicom'99, Seattle, Aug. 1999.

Alzieu, J. et al, Improvement of intelligent battery controller: state-of-charge indicator and associated functions, J. Power Source, vol. 67, pp. 157-161.

\* cited by examiner

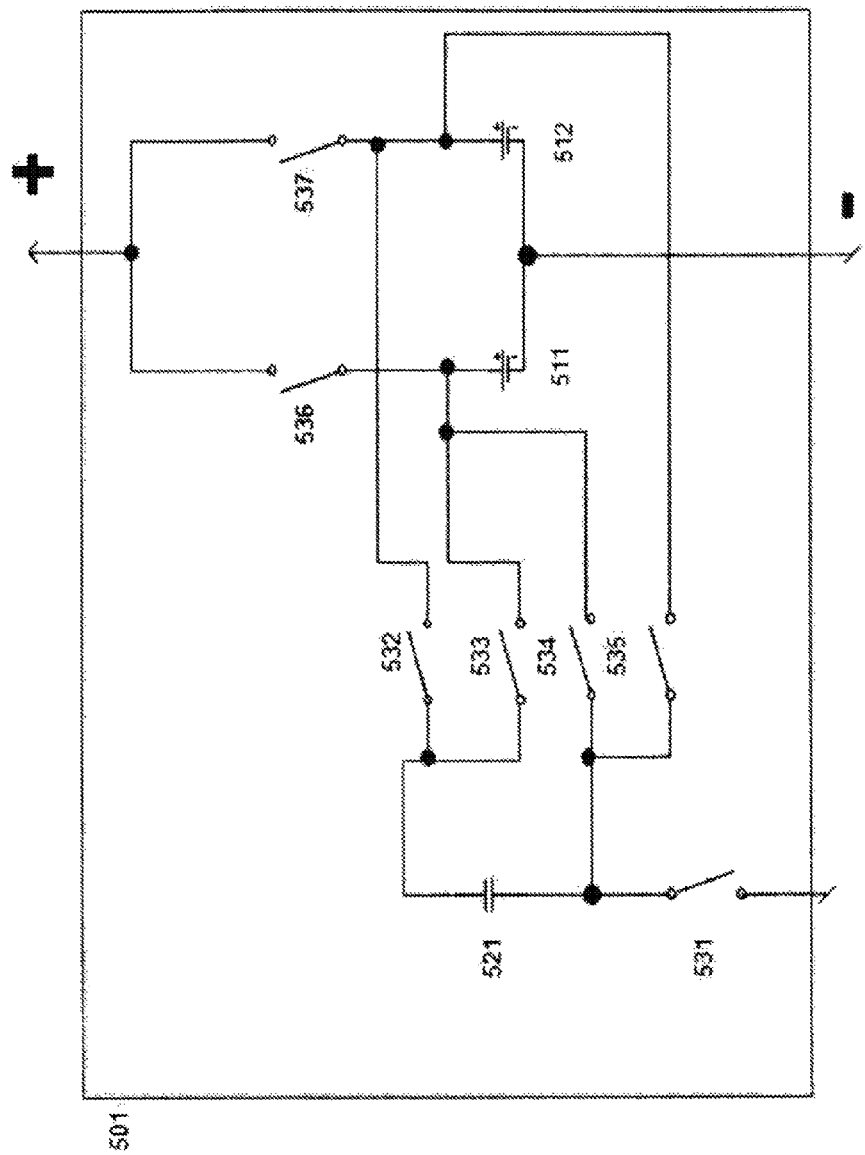

EXTENDED LIFE BATTERY

RELATED APPLICATIONS

This patent application is a national stage filing under 35 U.S.C. § 371 of International Application No. PCT/CA2013/000277, filed on Mar. 25, 2013, entitled "Extended Life Battery," which claims priority from U.S. provisional patent application No. 61/615,282, filed on Mar. 25, 2012, entitled "Controlled Multi-Core Battery System"; U.S. provisional patent application No. 61/662,882, filed on Jun. 21, 2012, entitled "Multi-Core Rechargeable Battery with extended calendar life"; and U.S. provisional patent application No. 61/683,691 filed on Aug. 15, 2012, entitled "Multi-Core Rechargeable Battery with extended calendar life", all of which are incorporated herein by reference in their entirety.

FIELD OF INVENTION

The present invention relates to battery technology and methods of extending and recovering battery lifetime and charge storage capacity.

BACKGROUND INFORMATION

The advances in battery technology cannot keep up with market demands. Effective solutions to extend or preserve battery lifetime and storage capacity are needed.

Batteries are electrochemical energy storage systems. The lifetime of a battery is limited by the aging process. A battery ages (loses its energy storage capacity) with use, and with time, even if not used. After the energy storage capacity of a battery has decreased below a threshold value it is said to have reached its end of life. Aging from use is called "life cycle aging", while aging with time, is known as "calendar aging." These two processes occur together, and their magnitudes depend on the battery's application and usage pattern. As such, one process may dominate.

A battery's operating conditions affect the aging process. Temperature and high charging voltages are some of the most relevant factors in aging. Exposing a battery to high temperatures and storing the battery in a full state-of-charge for an extended period may age a battery faster than charge-discharge cycling from use. Different battery types have different life cycle aging and calendar aging characteristics.

Lithium-ion batteries age when exposed to elevated temperatures and when stored in a fully charged (high voltage) state. A temperature above 30° C. (86° F.) is considered an elevated temperature. For most Lithium-ion (Li-ion) batteries, a cell voltage above 4.10 V/cell is considered a high voltage.

A laptop battery is usually exposed to an elevated temperature when operating. In normal use, a laptop battery is also usually fully charged and may rarely be disconnected from the charger. Some cell phone batteries have similar operating conditions. during their lives. It is common for a cell phone battery to lose much of its capacity during the first one or two years of its calendar life A short description of how batteries operate is provided for convenience. Batteries contain chemically active materials and deliver energy through electrochemical reactions. When current is discharged from the battery, two concurrent phenomena occur:

i) the concentration of the active materials around the electrode drops forming a depletion region and generating a concentration gradient. This is known as the polarization effect. This concentration gradient acts as an internal resistance and reduces the charging efficiency of the battery;

ii) at the same time, the active materials move toward the depletion region due to a diffusion process resulting in a decreased gradient concentration and decreasing the polarization effect.

Depletion typically occurs faster than diffusion. Both phenomena act concurrently to distribute the active materials. In the ideal case depletion takes place at a similar rate to the diffusion and the concentration of active material is at an ideal equilibrium point whereby the battery has maximum efficiency. In reality however, the equilibrium point settles at a different level. If diffusion constantly exceeds depletion effect, the battery delivers less energy than expected. Conversely, if the polarization effect overcomes the diffusion process, the battery will be discharged before the active materials are actually exhausted.

US patent application No. 2010/0164430 (Lu) shows that during discharging of a Lithium-ion battery cell (or cells), lithium ions accumulate on the cathode. Conversely, during charging, the lithium ions accumulate on the anode of the battery. The accumulation of ions during discharging generates a concentration gradient which compensates for the movement of ions during discharging. A gradient is also produced during the battery charging process. In an equivalent circuit model, the concentration gradients are modelled as internal resistances and have a negative effect on the battery efficiency during both charging and discharging cycles. If a battery has large internal resistance then a large portion of its stored energy will be dissipated internally by the internal resistance when it is discharging and will not be delivered to the load. Similarly the internal resistance will dissipate energy during charging making charging less efficient. A battery's storage capacity is therefore diminished by internal resistance.

It is known that battery capacity and lifetime can be improved by using a pulsed discharge current instead of a constant discharge current. This is due to a charge recovery process that takes place in the battery during the time between discharge pulses when the battery is not discharging, called the "rest time".

It is also known that the battery lifetime and capacity significantly increases when a battery is pulse charged. Some studies also suggest that reversing the current for a short time during charging or discharging in a technique known as the 'mode reversal', positively affects the battery capacity and lifetime. For example when a short discharge pulse is applied prior to each charging pulse, this improves the charging process of the battery. When a short charging pulse is applied prior to each discharging pulse, this improves the battery recovery between discharging pulses and increases the battery storage capacity.

The battery's state of charge is directly related to the discharge current rate and decreased by it. However, if the current is interrupted, the battery's state of charge may recover and improve during the interruption. The recovery process is dependent on the duration of the interruption, the capacity of the battery, and the present state of charge of the battery. The recovery effect progressively decreases as the battery's state of charge decreases, until all the active materials are exhausted and the battery is depleted.

A simple known model describes the battery behavior during the discharge process and considers the recovery mechanism depending on the rest time only. Other battery models take into account the degradation of the recovery mechanism as the battery state-of-charge decreases.

Typically Li-ion batteries used in mobile applications last between one and four years during which interval they constantly lose the capacity to hold a charge for long periods of time. These battery systems are typically used in cell phones, cameras, tablets, battery packs, portable power tools and laptops due to their high energy density. The capacity loss is mainly due to increased internal resistance. Processes causing an increased internal resistance are more damaging when the battery charge state is close to full for longer periods. The internal cell resistance increases to a point where the battery pack can no longer deliver the stored energy irrespective of the fact that the battery indicates it is fully charged. In other words, a new battery when fully charged delivers its nominal charge. A used battery delivers less than its nominal charge.

Internal resistance typically increases for lithium-ion/lithium-polymer batteries with age and with each charge cycle. The aging speed is dependent on the working temperature and the battery state-of-charge. Most mobile devices constantly allow the battery to be at a fully-charged state while the device is plugged into a power adapter. Both these factors, namely, the constant fully-charged state of the battery and the elevated working temperatures contribute to a reduction of the battery life.

SUMMARY OF THE INVENTION

There is a need for an improved battery charging process for rechargeable batteries in order to increase battery lifetime while also increasing the battery charging speed.

There is also a need to extend and preserve the lifetime of batteries for obtaining important savings to the battery users.

Furthermore, there is a need to reduce the impact of the discharged battery on the environment; by extending battery lifetime, the impact on the environment can be significantly reduced, along the expense for disposing the depleted batteries.

A method comprising performing a charge and a discharge operation of a cell within a electrochemical energy storage system whereby said charge and discharge operations are performed internally to the electrochemical energy storage system is disclosed.

In an embodiment the charge and discharge operations are performed between at least a first storage cell and at least a second storage cell.

In another embodiment the charge and discharge operations are performed between at least a first storage cell and at least a passive storage element.

The passive energy storage element could be a capacitor or an inductor.

In another embodiment the charge operation is performed between at least a first cell and a combination of a plurality of other cells and a passive storage element.

The charging operation could use a DC to DC converter.

The respective durations of the charge and discharge operations could be based on operational parameters of the electrochemical energy storage system. The operational parameters could include: a temperature, a cell charging current value, a cell discharging current value, a cell voltage, an internal impedance, a internal battery pressure, a number of system charge/discharge cycles.

The charge and discharge operations could be performed repetitively until a cell voltage threshold is met.

According to an aspect of the disclosure an electrochemical energy storage system includes at least one storage cell and circuitry for performing a charge and a discharge operation of said cell whereby said charge and discharge operations are performed internally to the electrochemical storage system.

In an embodiment the charge and discharge operations are performed between at least a first storage cell and at least a second storage cell.

In another embodiment the system contains a passive energy storage device and the charge and discharge operations are performed between at least a first storage cell and at least said passive energy storage element. The passive energy storage element could be a capacitor or an inductor.

The electrochemical energy storage system could contain a DC to DC converter and the charge operation could be performed using the DC to DC converter The system could contain a controller for determining the duration of the charge and discharge operations from the operational parameters of the electrochemical energy storage system. The system could contain circuitry for sensing the operational parameters of the system including: an internal battery pressure, a charging current, a discharging current, a cell voltage, an internal impedance, a number of charge/discharge cycles.

The charge and discharge operations could be performed repetitively until a cell voltage threshold is met.

Numerous scientific papers and publications teach that Li-ion battery capacity deterioration after a calendar life of more than 5 years, is not recoverable and the battery capacity fading is irreversible. Our experiments demonstrate that the lifetime of a battery may be extended significantly by maintain and/or restoring the capacity using pulsed charging/discharging, and/or energy juggling methods described above.

DESCRIPTION OF THE DRAWINGS

FIG. 5 is a schematic diagram of an exemplary energy juggling circuit;

DESCRIPTION OF THE PREFERRED EMBODIMENTS

Figure 1A:
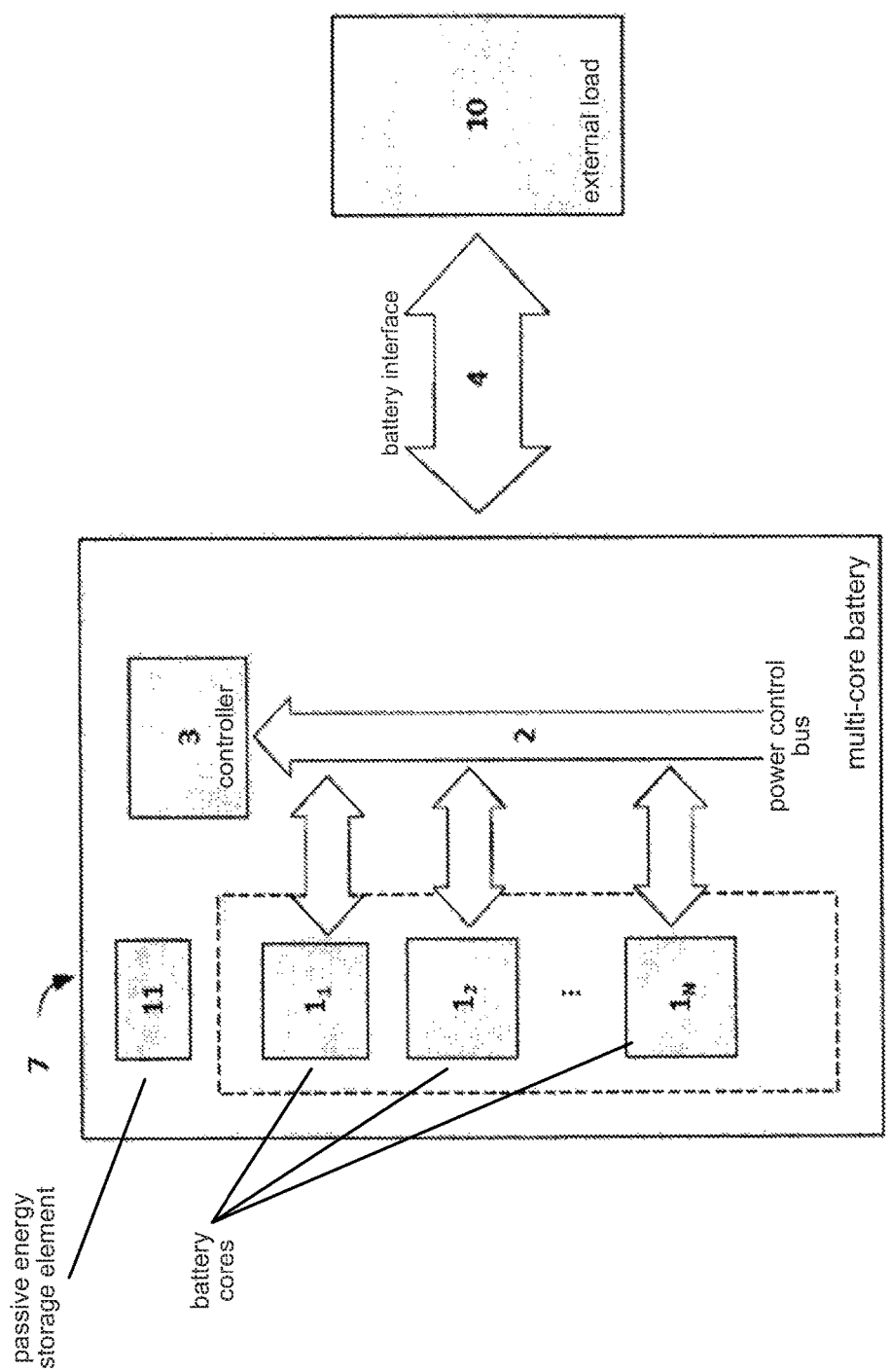
FIG. 1A is a block diagram of an exemplary Multi-Core Battery of the present invention.

The methods and systems described herein are applicable to a variety of Multi-Cell Batteries (MCB)(also referred to here as multi-core batteries) used currently for electric and plug-in hybrid cars, scooters, portable computers and tablets, portable power tools, uninterruptible power supplies, portable light sources, bi/uni-cycles, or other various portable electronic devices. It is to be understood that the methods and systems described here are not limited to the above battery types, but they are applicable to any multiple cell battery, or single cell battery, also referred to here as multiple core or single core batteries. Preferably, the battery types may include, but not limited to, nickel cadmium batteries, nickel metal hydride batteries, lithium batteries, or lead-acid batteries.

In this specification, the term 'static parameters' refers to, but is not limited to, the nominal battery voltage, nominal internal battery impedance, the nominal output current of an individual battery core into a standard load R, the age of the battery (calendar age and the remaining life), the ambient temperature, charge/discharge history of an individual battery cores, etc. Furthermore, in this specification the term 'operational parameters' describes actual operating values of the battery and includes the charging and discharging current, the charging and discharging voltage, state of charge of the battery, state of charge of individual cores, internal battery pressure, power, number of charge and discharge cycles. Other operational parameters may also be considered in the methods and apparatus described here.

The calendar life of a battery, may be extended significantly if the battery is charged and discharged using pulses rather than a continuous current. The calendar lifetime of a battery may be also be extended significantly if the duration of the charging, discharging pulses and/or the rest times between pulses of the cores in a MCB are selected based on the battery's static and operational parameters.

In this invention a procedure called 'energy juggling' is used to extend or recover a battery's capacity and lifetime. In energy juggling a battery is pulse charged and pulse discharged while it is idle and not supplying a load. In one embodiment of energy juggling, individual cores in an MCB are pulse-charged and pulse discharged from/to other cores of the MCB. In another embodiment of energy juggling individual cores in an MCB, are pulse-charged and pulse discharged from/to a combination of other cores and an internal passive energy storage device. In yet another embodiment of energy juggling individual cores in an MCB, are pulse-charged and pulse discharged from/to an internal passive energy storage device. In yet another embodiment of energy juggling the core of a single core battery is pulse-charged and pulse discharged from/to an internal passive energy storage device. The internal passive energy storage device may include but is not limited to a capacitor an inductor.

Energy juggling has a number of advantages. For example, it allows a battery to be stored at full charge without suffering the normal lifetime reduction associated with storage at full charge since periodic energy juggling during storage recovers lost battery lifetime and capacity. Energy juggling also allows the lifetime and capacity of a degraded battery or cores to be restored if, for example, the battery has been subjected to high temperatures or arduous cycling or other operations that degrade its capacity and lifetime.

The duration, shape and periodicity of the charge/discharge pulses used in energy juggling may be determined based on the operational parameters of the battery.

In a further embodiment of energy juggling, during the rest time between pulses, each core is subjected to 'mode reversal' wherein, after being discharged, the core is briefly charged for a prescribed, short period with a predetermined current applied during the rest period. In different embodiments the mode reversal is performed for portions of the rest period such as the beginning or end of the rest period, or it may be performed for the entire duration of the rest period.

Pulse Charge/Discharge

FIG. 1A is a block diagram of an exemplary Multi-Core Battery (MCB) of the present invention. MCB 7 contains multiple battery cores, $1_1, 1_2, \ldots 1_N$. Each battery core $1_1, 1_2, \ldots 1_N$ contains at least one battery cell (not shown). Battery cores $1_1, 1_2, \ldots 1_N$ may be connected in series or in parallel or in a series-parallel combination to provide the required output voltage, depending on the application. Battery core $1_1, 1_2, \ldots 1_N$ may consist of a single cell or may be self-sufficient batteries. Battery cores $1_1, 1_2, \ldots 1_N$. may have the ability to function independently, or in combination with other cores within the MCB 7. Battery cores $1_1, 1_2, \ldots 1_N$ connect to MCB controller 3 via power control bus (PCB) 2. PCB 2 may carry switch control signals, core and output voltage sense signals, current sense signals, temperature sense signals, internal pressure sense signals or other sense signals. Controller 3 monitors the status of battery cores $1_1, 1_2, \ldots 1_N$ and controls the operation of MCB 7. In one embodiment controller 3 is a microcontroller and includes a Central Processing Unit for processing instructions and data, on-board memory for storing instructions and data, a digital to analog converter for voltage measurement and drive circuitry for the control of switches. MCB 7 connects to external load 10 or a battery charger (not shown) through battery interface 4. MCB 7 optionally contains passive energy storage element 11 for the temporary storage of energy. In one embodiment passive energy storage element 11 is a capacitor, and in another embodiment it is an inductor. MCB 7 may include a switching network (see FIG. 4, for example) which allows for the battery cores $1_1, 1_2, \ldots 1_N$ to be configured in multiple ways to facilitate energy juggling.

In some embodiments, the energy juggling operation of each battery core is controlled and monitored by controller 3. Controller 3 may monitor one or more of the following parameters: the charging/discharging current, cell voltages, battery temperature, internal battery pressure, battery voltage, mechanical stress, and state of charge. Other relevant parameters of the battery core may also be monitored if desired. Monitoring circuitry may include temperature, current control, pressure sensors, safety circuits, voltmeters, ammeters and other sensors (not shown), as needed.

In another embodiment, an MCB may have more than one controller whereby each controller monitors and operates one or more cores in the MCB. In still another embodiment, controller 3 may be implemented externally to MCB 7. Other variants of distributed control are also possible.

Figure 1B:
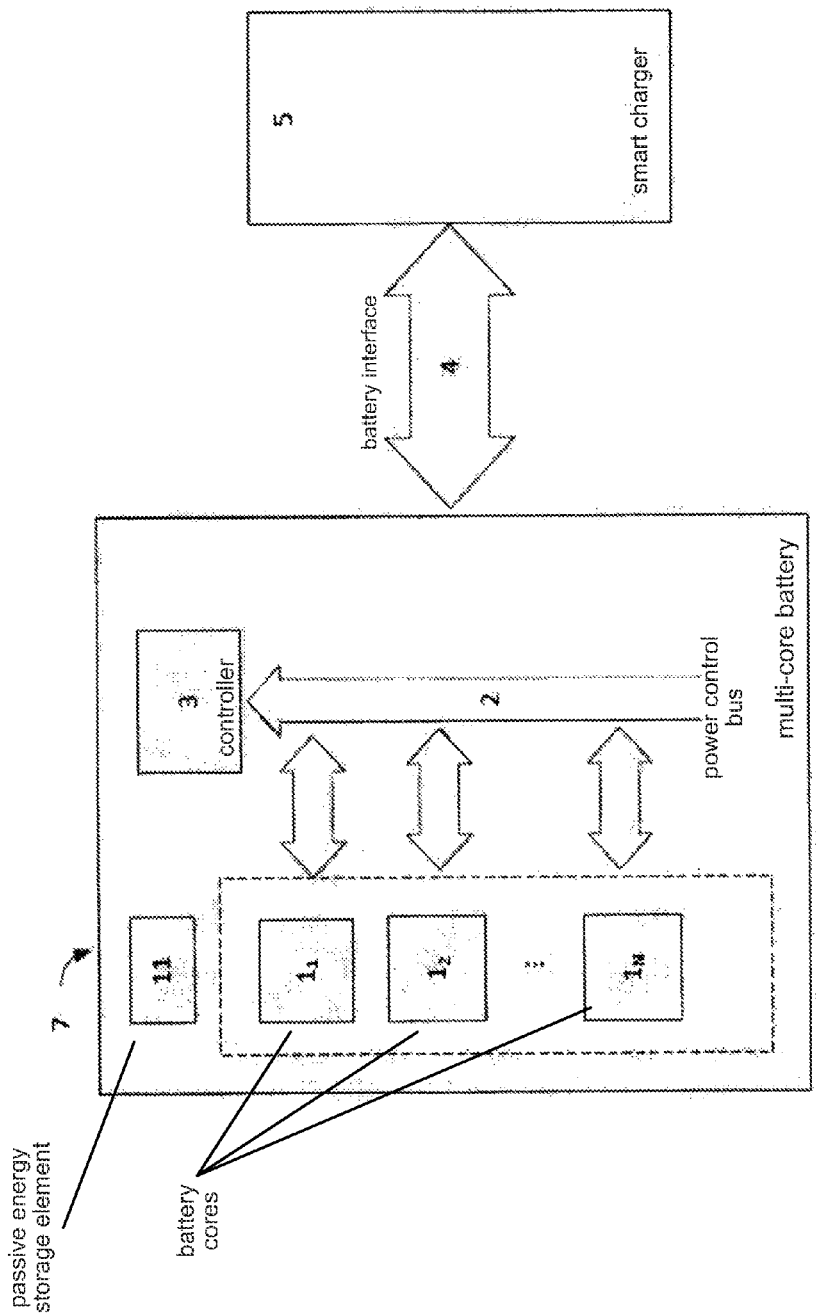
FIG. 1B is a block diagram of an MCB connected to a smart charger.

FIG. 1B is a block diagram of an MCB connected to a smart charger. In this embodiment controller 3 communicates with smart charger 5 over battery interface 4. In some embodiments control of the MCB 7 may be shared between the MCB controller 3 and the smart charger (SC) 5. The measurements are provided to smart charger 5 over battery interface (IF) 4.

Figure 1C:
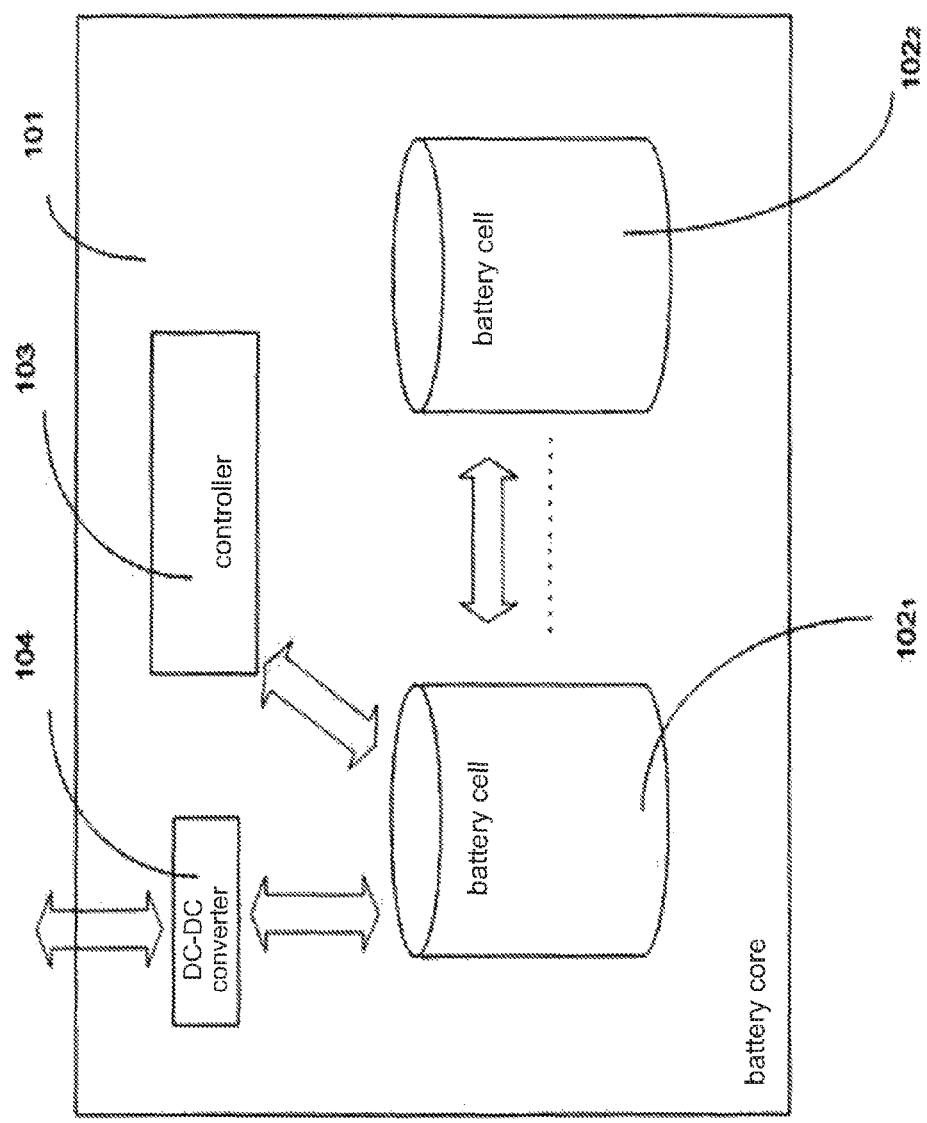
FIG. 1C is a block diagram of an example battery core.

In other embodiments, the control of the cores may be implemented entirely in the SC 5, In this case SC 5 also monitors and operates the MCB. Hybrid configurations are also possible, where some cores have their own controller 3 and the SC 5 controls the functionality of the remainder of the battery cores which are not controlled by controller 3. FIG. 1C, for example, shows a block diagram of an example battery core 101, in accordance with some embodiments. Battery core 101 contains battery cells 1021 and 1022 for energy storage. Core controller 103 controls the operation of cells 1021 and 1022. Battery core 101 optionally contains DC to DC converter 104 for the conversion of the voltage of cells 1021 and 1022 to a DC level.

In another embodiment MCB controller 3 detects the usage pattern of MCB 7 including its charge and discharge pattern and determines when to charge the MCB 7 to a 'vacation level' charge. The vacation level is defined here as the level of charge at which the battery may be stored for a long period without significant use without causing major capacity degradation. Once at vacation level, the MCB controller 3 will then decide, based on the detected usage pattern, the best time to charge the stored battery to full capacity. This delay of full charging until required may substantially improve battery lifetime. This similar optimization of charge levels is not restricted to MCBs and can also be used with single core batteries.

In another embodiment, the MCB 7 is not rechargeable and each core is a disposable battery and no energy juggling is performed inside the MCB 7. The discharging cycle may be performed in a continuous mode, when all cores are discharged in parallel, or in a pulse mode, when discharging of each core is done during an assigned time slot. The time slots are assigned by the MCB controller 3. Discharging time slot durations are dependent on the energy demand of the external load and current condition of each non-rechargeable battery core. The pulse discharge mode reduces the polarization effect, while individual adjustments of discharge timing compensate for variations in depletion/diffusion processes attributable to the manufacturing process. When a core becomes unusable, the MCB controller 3 may indicate which core has to be replaced or serviced.

When charged from an external power source, each battery core, or group of cores, may be connected to the external power source for short periods of time. Duration and periodicity of the charging pulses is optimized according to: the design parameters of the battery core, individual history of each battery core or group of cores, individual state of charge of each battery core or group of cores, operational factors, and estimated internal impedance of the battery core. Other parameters may also be taken into consideration. One of such parameters might be the charging current value measured during different parts of a charging pulse. It is beneficial to measure the charging current value during the first portion of charging pulse and later during the second portion of charging pulse. Multiple charging current measurements (more than two) performed during the charging pulse would allow even better accuracy of accessing the current state of charge of each individual battery core, or group of battery cores.

In still another embodiment, multiple MCB 7 communicate with each other, and use a central controller (not shown).

Battery cores that are affected by aging, capacity deterioration and physical degradation, can be withdrawn from use in various ways. For example when all available battery output current is required, the cores are connected in parallel. However, in some routine energy delivery modes, the weak cores may be left aside to recover. The weak cores still participate in energy juggling process in order to recover their charge storage capacity. Finally, when a core becomes unstable and dangerous to be actively used, the MCB controller 3 disconnects the core from the MCB activity.

In another embodiment, the MCB 7 uses a variable number of battery cores during the charging and discharging processes. For example, when a smaller amount of energy needs to be stored in the battery, MCB controller 3 can decide to use only part of its battery cores. The unused cores are kept at low charge "vacation" levels and continuously maintained through the energy juggling mechanism. A smart charger 5 communicates with the MCB controller 3 to negotiate the timing and the duration for the charging pulses. Such usage model might be beneficial in cases where energy costs are high and usage of all battery cores would require purchasing of more energy than necessary. The unused battery cores benefit from low charge levels, significantly lower compared to current industry recommended storage charge levels. Currently recommended "vacation" levels for Li-ion batteries are 3.6V to 3.8V. An MCB using energy juggling however, might allow unused cells to be kept under 3.1V to 3.4V without affecting the battery cell calendar lifetime.

Similar approach could be used when only a small amount of energy (compared to the overall energy already stored in the Multi-Core battery) is requested by the load. In such case, only limited number of battery cores (may be just one) participate in the discharge process.

Figure 2:
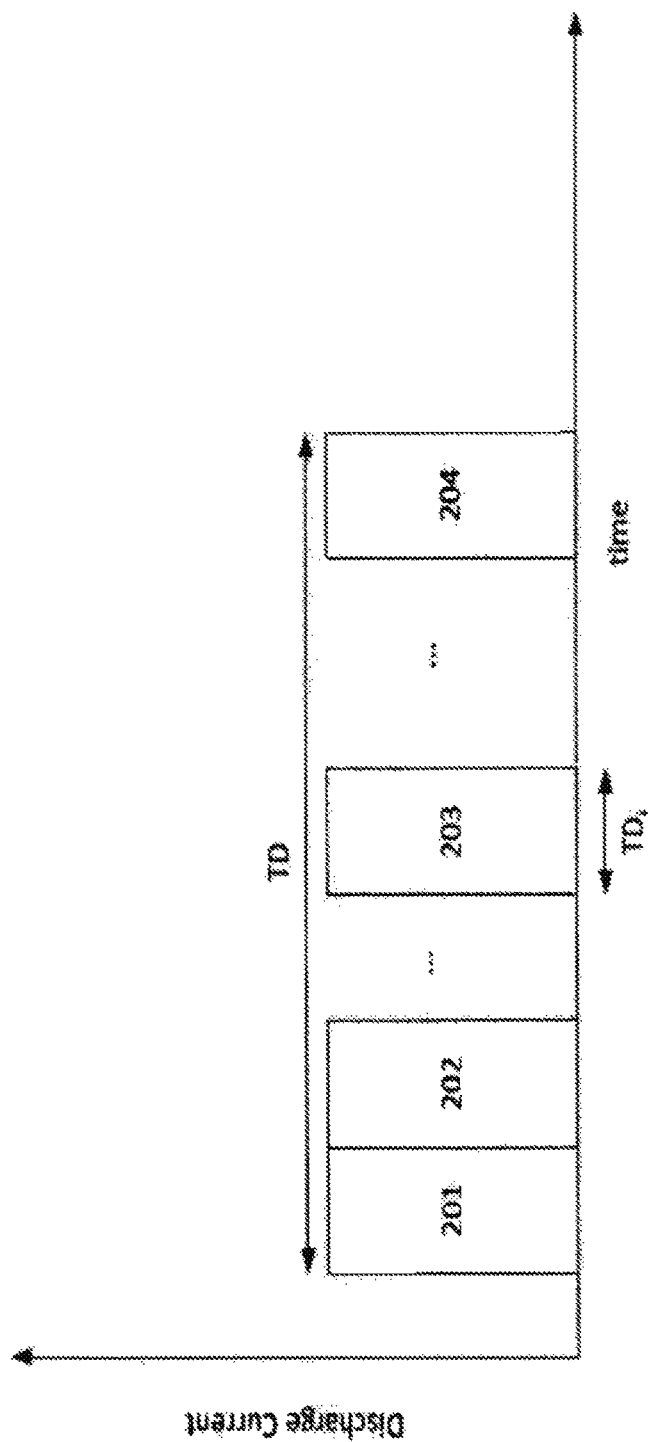
FIG. 2 is an exemplary discharge timing diagram.

Energy juggling involves the charge and discharge of individual battery cores in an MCB or the charge and discharge of the single battery core of a single core battery. FIG. 2 is an exemplary discharge timing diagram. It shows the discharge timing for the N cores $1_1$-$1_N$ of MCB 7. During a first period 201, the battery core $1_1$ is discharged while all, or some, other cores $1_2$-$1_N$ are resting. During a second period 202, the battery core $1_2$ is discharging while all, or some, other cores are resting, and so on. During time period 203 battery core $1_i$ is discharged while all or some cores are resting. Finally, during time period 204 battery core $1_N$ is discharged while all or some cores are resting. For the general case when the MCB 7 has N cores, the total discharge period is defined as 'TD' and the discharge time for core i is denoted as 'TDi', where i∈[1–N]. The term 'discharging-to-rest time ratio' (DTR) is used for the ratio between the discharge and rest times for a core and is given by the formula $$DTR=TDi/(TD-TDi).$$

A similar approach may be used for charging the cores of the multi-core battery (MCB) 7. The total charging time for all battery cores in MCB 7 is denoted as 'TC'. The charging time for core i is denoted as 'TCi', where i∈[1–n]. The term 'charging-to-rest time ratio' CTR is used for the ratio between the charging and rest time of a core and is given by the formula $$CTR=TCi/(TC-TCi).$$

While FIG. 2 shows equal discharge times for all cores, the charging and discharging durations for individual cores can be different in some embodiments. Pulses of different duration may be used for the same core.

Figure 3:
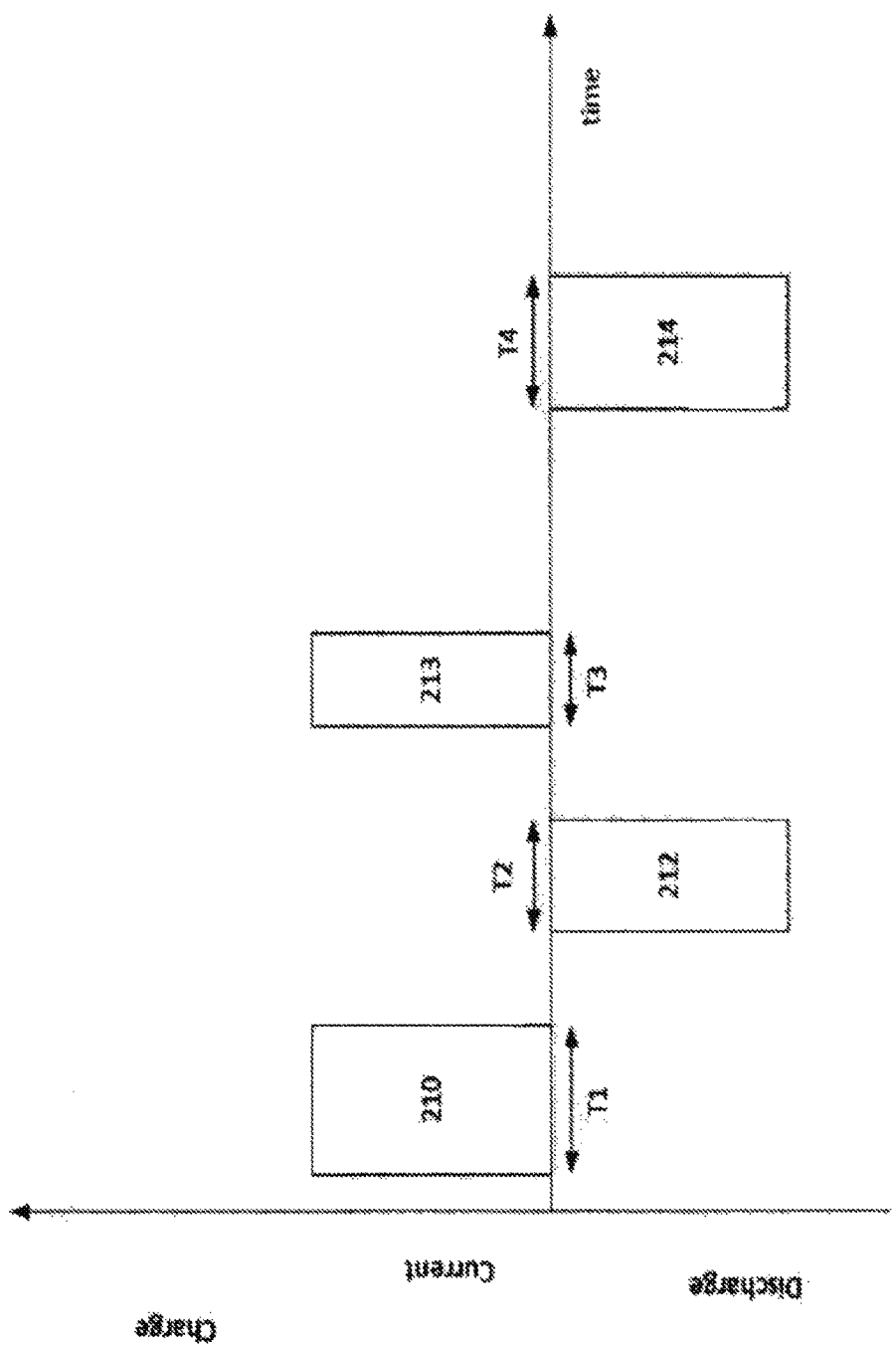
FIG. 3 is an exemplary timing diagram for charging and discharging of a core.

FIG. 3 is an exemplary timing diagram for charging and discharging of a core. There is a first charge period 210 with pulse duration T1, followed by a first discharge period 212 with a pulse duration T2, followed by a second charge period 213 of duration T3, and finally a second discharge period 214 of duration T4. Using charge and discharge pulse durations of differing values is advantageous for the battery health in some applications.

In one embodiment, the durations of TDi and TCi are adjusted according to the state of charge of the i-th core. For example when core i has a low state of charge the duration TCi is increased.

In general, the DTR ratio and/or CTR ratio for each core is adjusted depending on the battery's static parameters and operational parameters.

Referring to FIGS. 1A and 1B, the smart charger 5, or the core controller 3 may determine the individual adjustments for each battery core. The smart charger 5 can also devise individual adjustments for groups of battery cores.

The charging energy for energy juggling may be supplied from smart charger 5.

Alternatively, the charging energy may be obtained from another core from within the MCB 7. In another embodiment, the charging energy for one core gets stored temporarily in an intermediary energy storage device and is supplied to another battery core via a DC/DC converter. In another embodiment, depending on the source used for charging the cores, i.e. one of the battery cores, or an external source), MCB 7 may be equipped with an ultra-capacitor, as to absorb a portion of the charging energy provided by the charging source. This portion of charging energy is then delivered to a load during the rest time.

By varying the duration, periodicity and shape of the charging pulses, various charging patterns may be selected to optimize the charging time for a specified core, or to optimize the battery calendar life, or to optimize the battery capacity.

Energy Juggling

As indicated above, energy juggling can reduce the energy losses and improve battery lifetime and capacity. The duration, shape and periodicity of the charge/discharge pulses may be adjusted depending on the actual state of charge of each battery core. In one embodiment, after a battery has been charged to a pre-established state of charge during a charging cycle, the charging cycle is stopped and energy juggling begins.

In other some cases, the energy juggling process may be started from the beginning of the MCB charging process.

In one embodiment of energy juggling, energy is pumped from one battery core to another battery core inside the MCB, such that the energy remains within the MCB. Energy juggling can occur not only when the battery is idle (not discharging into a load) or also when it is discharging into a load.

For example, in an MCB when a first core is discharging into the load, two other cores discharge a short current pulse into a fourth core. Thereafter, the most recent charged fourth core discharges into the load. During this discharging period the first discharged core is charged by a short high voltage pulse supplied from a newly configured group of two or more battery cores. The process is repeated so that each battery core gets periodically pulse charged and pulse discharged for a short period of time.

During energy juggling, a selected battery core can be charged with short pulses from one or more other cores of the MCB. A selected core can also be discharged into another core. A battery core can be connected in parallel with other cores, or in series with other cores. In some embodiments current pulses are delivered from one battery core to another via an intermediate energy storage device, such as a capacitor. In another embodiment, a DC/DC converter is used to accommodate the charging voltage requirements.

Figure 14:
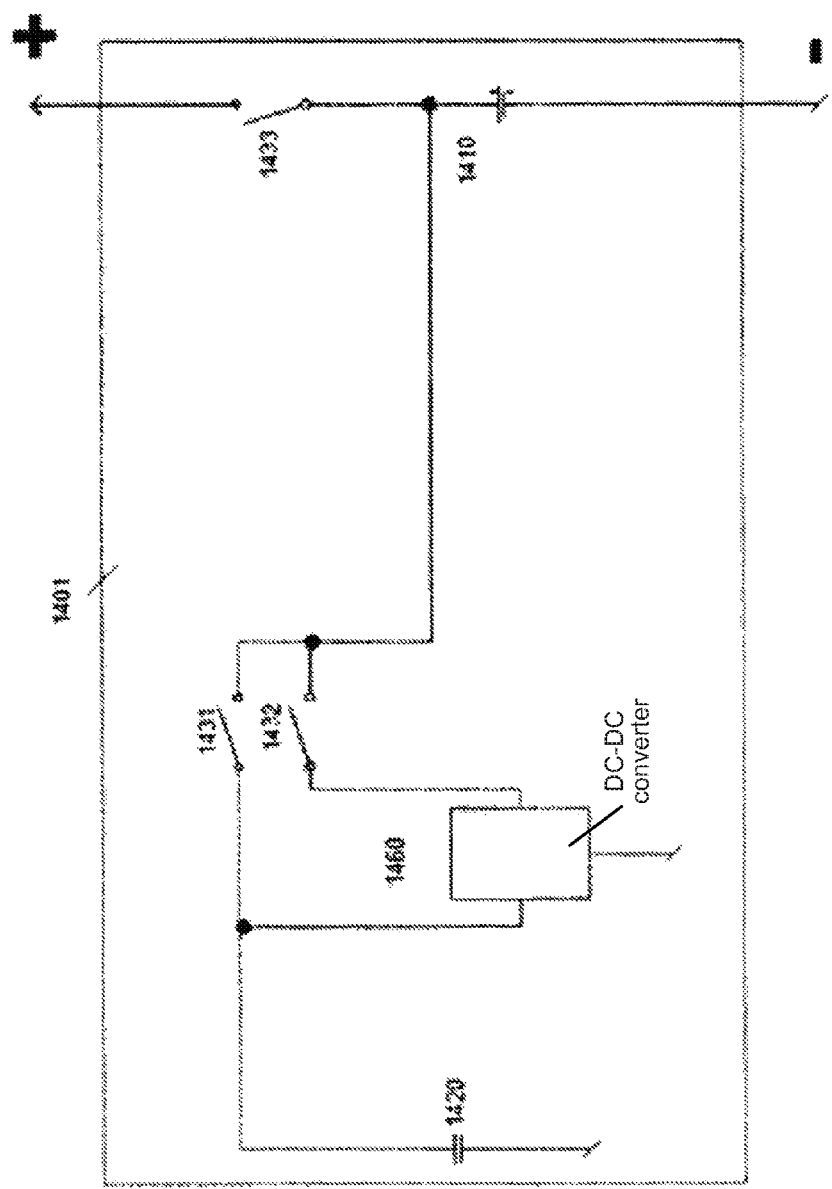
FIG. 14 is a schematic diagram of a battery using a DC to DC converter to generate a charging voltage.

FIG. 14, for example, shows a schematic diagram of a battery using a DC to DC converter to generate a charging voltage. Battery 1401 contains cell 1410, capacitor 1420, switches 1431,1432 and 1433 and DC to DC converter 1460. Energy juggling proceeds as follows. With switch 1431 closed and all other switches open, capacitor 1420 is charged from cell 1410. Switch 1431 then opens and switch 1432 closes. DC to DC converter 1460 supplies a charging current to cell 1410 at a voltage higher than voltage of cell 1410. DC to DC converter 1460 converter allows independent control of the timing and amplitude of the charging pulse. DC to DC converter 1460 is controlled by MCB controller 3 in one embodiment. DC to DC converter 1460 may use a variety of known architectures. In one embodiment DC to DC converter 1460 is a boost type converter.

In one embodiment a pulse duration 0.5 sec and pulse amplitude of 2-3 Amperes is used. It should be understood that pulse duration, periodicity, amplitude and shape could be different for each type of battery cell or group of battery cells. The duration periodicity, amplitude and shape of periodic pulses can be determined based on operational parameters of the battery.

Energy juggling involves charging/discharging the cores in a MCB in a certain order. Different numbers of battery cores may be used during the charging and discharging cycles. It is also possible to combine the battery cores into groups and to charge/discharge more than one battery core at a time. For example, during some energy juggling periods a group of 2 cores may charge a third core; then, a group of 3 cores may charge a group of two cores; thereafter, a group of 5 cores may charge a group of 3 cores, and so on. The battery cores may participate in different groups and as such, are exposed to different charging/discharging currents which further improves battery lifetime.

Figure 4:
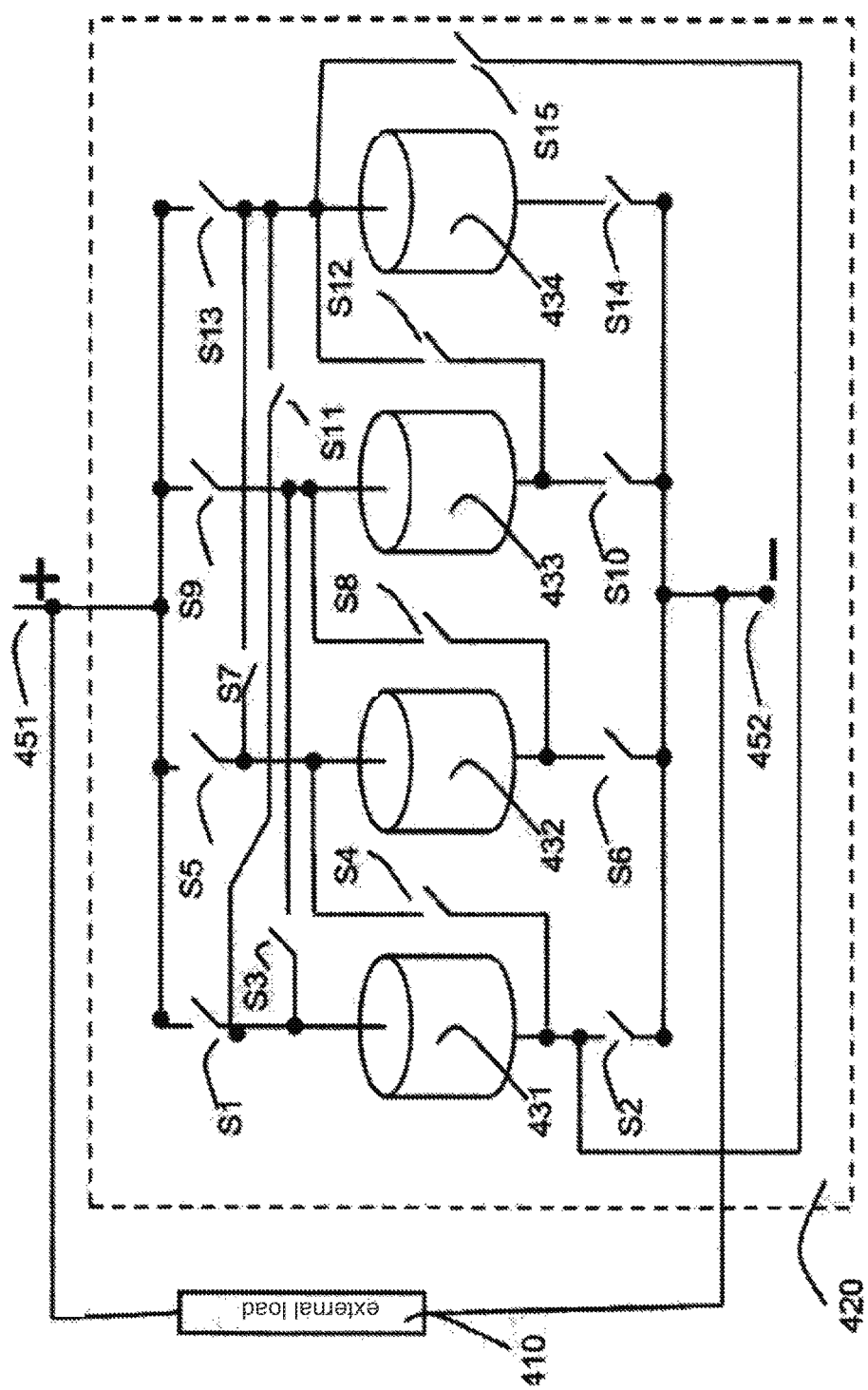
FIG. 4 is a schematic diagram of an exemplary switching network for a four-core battery.

The configuration shown in FIG. 4 is used to describe one embodiment of the method for extending the calendar lifetime of the batteries using pulse charging and discharging technique, called "energy juggling". In this example, each battery core includes at least one of: nickel cadmium, nickel metal hydride, lithium, lithium-ion or lead-acid battery.

FIG. 4 is a schematic diagram of an exemplary switching network for a four-core battery. MCB 420 contains four Li-ion battery cores 431, 432, 433, 434 and has a nominal charge storage capacity C. MCB 420 connects to external load 410 through output terminals 451 and 452. A plurality of switches S1 . . . S15 are used to configure the battery into multiple charging/discharging configurations. Other components of the MCB such as the controller and buses are not shown for clarity.

Table 1 shows the state of the switches S1 . . . S15 corresponding to three controlled pulse charge/discharge modes.

TABLE 1

| Switch # | | | | | | | | | | | | | | | Battery Mode |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | |
| 1 | 1 | 0 | 0 | 1 | 1 | 0 | 0 | 1 | 1 | 0 | 0 | 1 | 1 | 0 | 1) Battery delivers 3.7 V with current up to $4 \times 2C = 8C$ |

TABLE 1-continued

| Switch # | | | | | | | | | | | | | | | Battery Mode |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | |
| | | | | | | | | | | | | | | | (C has a numerical value for a core capacity) when discharging. All cores charging in parallel when charging |
| 1 | 0 | 0 | 1 | 0 | 0 | 0 | 1 | 0 | 0 | 0 | 1 | 0 | 1 | 0 | 2) Battery delivers 15.1 V with current up to 2 C. Charging is running with all cores in series. Voltage levelling required. |
| 0 | 0 | 1 | 1 | 0 | 1 | 0 | 0 | 0 | 1 | 0 | 0 | 1 | 1 | 0 | 3) Core 434 is connected to outside and can be charged from a charger or discharged into a load. Output voltage is 3.7 V. Cores 431, 432 are connected in series and provide 7.4 V discharge into core 433. Cores 431, 432, 4333, are all disconnected from outside. |

By changing the configuration for switches S1 ... S15 the battery can be configured to additional multiple modes similar to Mode 3, but with other pairs of battery cores discharging to a third core while another core is connected to an outside load 10. To avoid providing repetitive information we are not describing such modes. Preferably, in each mode, configuration is maintained for a very short period of time. We have tested time periods between 50 msec to 2 sec, but these periods can be longer depending on the state-of-charge of both the charging and discharging cores.

Different types of switches S1-S15 may be used for the high side (coupling to output terminal 451 and the low side (coupling to output terminal 452) switching to minimize losses during storage. If same type of switches are used, the voltage level V1 to which a first battery core 431 is charged by a second partner battery core 432, and the voltage level V2 to which the first battery core is then discharged to a third partner battery core 433, may be optimized to minimize overall energy losses.

Other arrangements may be used taking into account various factors relevant to charging/discharging requirements and core status. Timing, duration, and pulse shape for charging a battery core by its partner battery cores can vary depending on the state-of-charge, the health status of each core and other operational parameters. Discharging of battery cores into external load 410 can be done according to a pre-established rotation. In such a case, current is constantly provided to an external load 410.

As an example, for a Multi-Core Battery with 230 battery cores forming a 120V battery, the output voltage may be adjusted in increments of one cell voltage, or 3.7 V. As mentioned above, for the highest output current and lowest output voltage, all battery cores are connected in parallel.

Due to the fact that the battery cores are practically never connected in parallel for long periods of time, there is no need to pre-match their internal resistances, as usually done when battery cores are assembled in an MCB. As the internal resistance of cores change in time, the cores become quite different from each other. The monitored differences in battery cores may be compensated by a variable number of battery cores grouped for charging and discharging during the energy juggling process. Similar timing and group adjustments are done during pulse charging and pulse discharging as described in connection with FIG. 3.

Each core of MCB 7 may be equipped with an individual controller and a safety switch to deal with external factors like temperature, overload, pressure, etc. The individual core controllers communicate through a bus such as PCB bus 2 in FIG. 1A to control switches 51-515. The cores may have voltage and current sensors which may be controlled by a MCB controller 3 in FIG. 1A, or from outside the MCB, by charger 5 in FIG. 1B. Switch and battery core control may be also done through a wireless channel such as Bluetooth, WiFi, specialized UHF communications, conventional RF communications or NFC communication.

It has also been observed that with periodic energy juggling, a Li-ion battery maintains almost a constant capacity even when operating at elevated temperatures of +55° C. for 3 months. The results showed full restoration of the battery's nominal capacity by energy juggling.

FIGS. 5-8 illustrate various circuits that may be used for energy juggling between two battery cores via a capacitor.

FIG. 5 is a schematic diagram of an exemplary energy juggling circuit. Circuit 501 contains battery cells 511 and 512, capacitor 521 and switches 531, 532 ... 537. Capacitor 521 is sequentially connected to battery cells 511 and 512 for controlled periods of time using switches 531 to 537 to perform charging and discharging of battery cells 511 and 512.

Capacitor 531 may be a ceramic or electrolytic capacitor; other types of capacitors, or combinations thereof may also be used. The use of a super-capacitor (ultra-capacitor) is also possible. Furthermore, groups of capacitors could be used instead of one capacitor. Charge could be transferred to an individual capacitor or group of capacitors dedicated to each battery cell or each group of battery cells or batteries involved into the energy juggling process.

A rechargeable battery may be used for performing the temporary energy storage function of the capacitor. Such a battery may be used as a temporary energy storage, subsequently transferring energy between battery cells, or groups of battery cells, or batteries. The combination of a capacitor and a battery is also possible for such temporary energy storage purposes. An inductor may also be used as a temporary energy storage device and perform a similar energy transfer function.

When capacitor 521 is connected parallel to battery cell 511 (e.g., switches 533, 531 CLOSED), for a first controlled period of time, capacitor 521 is first charged to a voltage level Vcap, while cell 511 is discharged by a controlled amount of energy. The amount of energy is controlled by adjusting the first period of time during which 521 is connected parallel to cell 511. Thereafter, capacitor 521 is connected in series with cell 512 having a voltage Vcell2 and the voltage across the combination of capacitor 521 and cell 512 reaches a combined value (Vcell2+Vcap) sufficient to support the charging of 511. The charging of cell 511 by the parallel combination of capacitor 521 and cell 512 is performed for a second controlled period of time. During this second period of time, a portion of the charge previously supplied to capacitor 521 and a portion of charge from cell 512 are transferred to cell 511. The second period of time may be adjusted whenever the transferred amount of energy needs to be adjusted.

Instead of a single current pulse as described above, multiple current pulses could be used. In one embodiment, each energy transfer consists of multiple current pulses each of which has an adjustable duration, amplitude and shape. In some cases, it is beneficial to perform the energy transfer with current pulses of varying duration, shape and amplitude.

Similarly, the energy juggling process may be performed starting with battery cell 512 initially discharged onto capacitor 521 and then charged back from capacitor 521 coupled in series with battery cell 511.

Figure 6A:
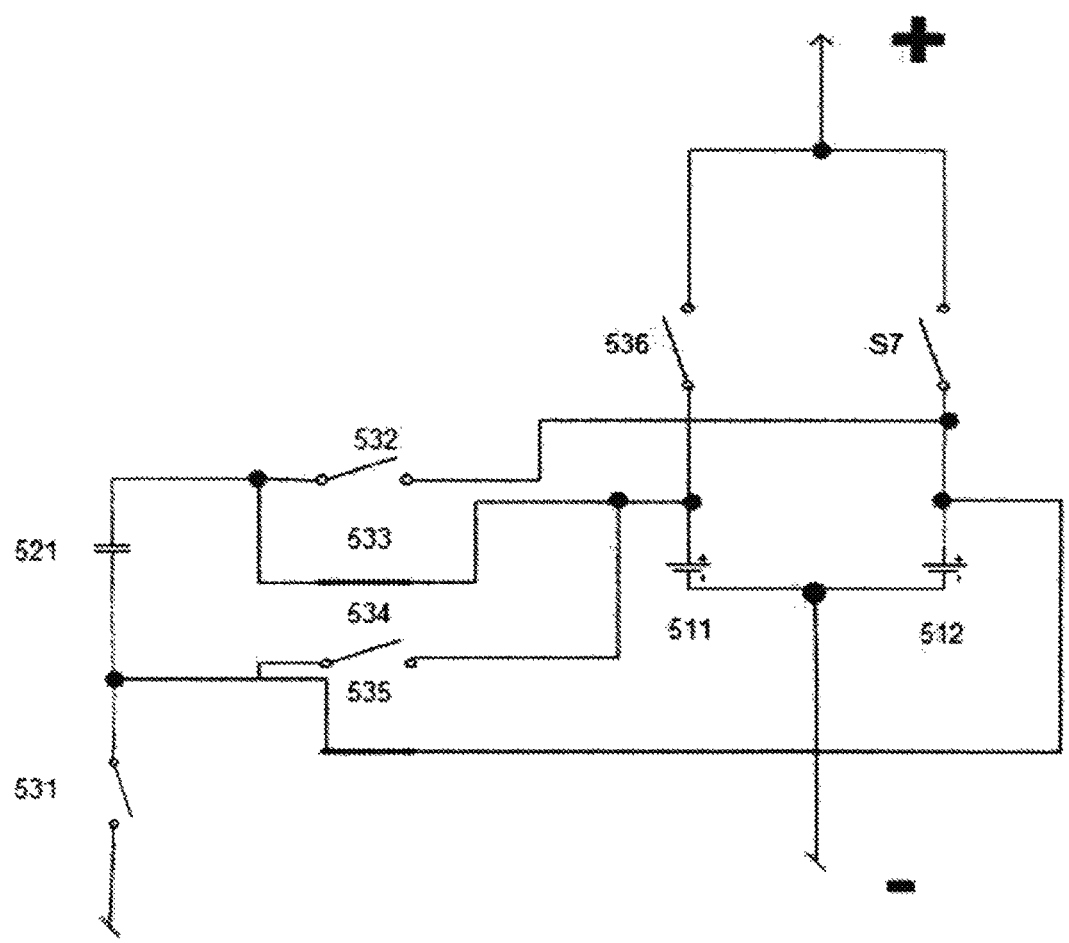
FIG. 6A is a schematic diagram of an exemplary energy juggling circuit configuration.
Figure 6B:
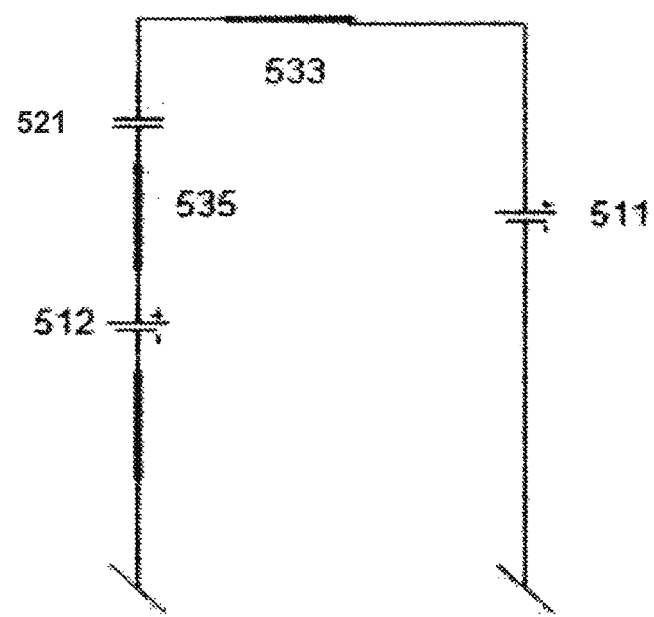
FIG. 6B is a simplified circuit diagram of FIG. 6A.
Figure 7A:
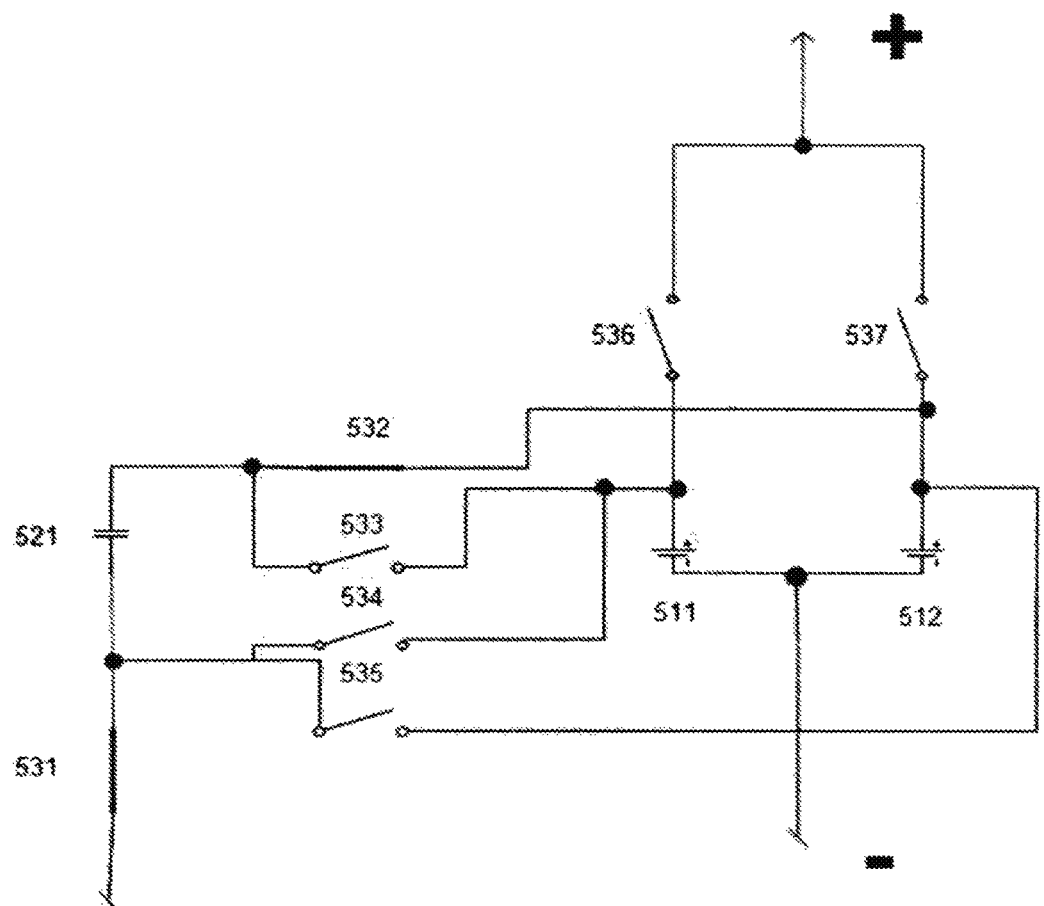
FIG. 7A is a schematic diagram of another exemplary energy juggling circuit configuration.
Figure 7B:
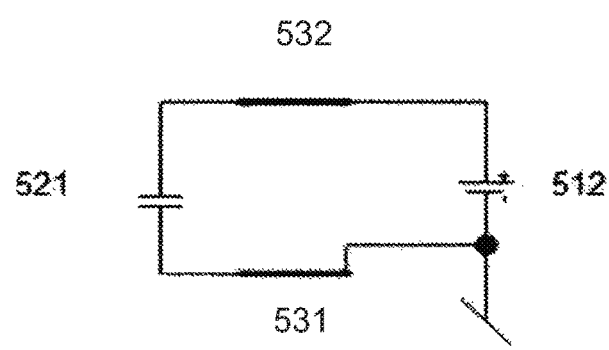
FIG. 7B is a simplified circuit diagram of FIG. 7A.
Figure 8:
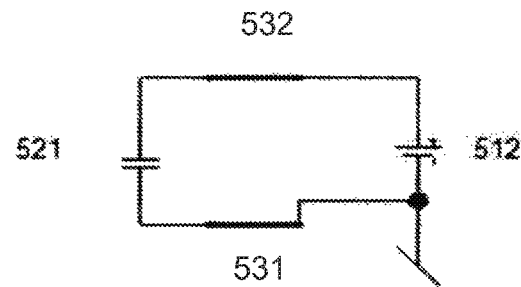
FIG. 8 is a schematic diagram of another exemplary energy juggling circuit connection.

A number of possible energy juggling circuits may be configured through switches 531 to 537 as further shown in FIGS. 6 (6A, 6B), 7 (7A, 7B), and 8. FIG. 6A is a schematic diagram of an exemplary energy juggling circuit connection. Switches 533 and 535 are closed, capacitor 521 is connected in series with cell 512 for charging cell 511. FIG. 6B is a simplified circuit diagram of FIG. 6A. FIG. 7A is a schematic diagram of another exemplary energy juggling circuit connection. Switches 532 and 531 are closed, capacitor 521 is connected parallel to cell 512 and is charged by cell 512. FIG. 7B is a simplified circuit diagram of FIG. 7A. FIG. 8 is a schematic diagram of another exemplary energy juggling circuit connection. Switches 531 and 532 are closed and capacitor 521 is charged by cell 512.

Figure 9:
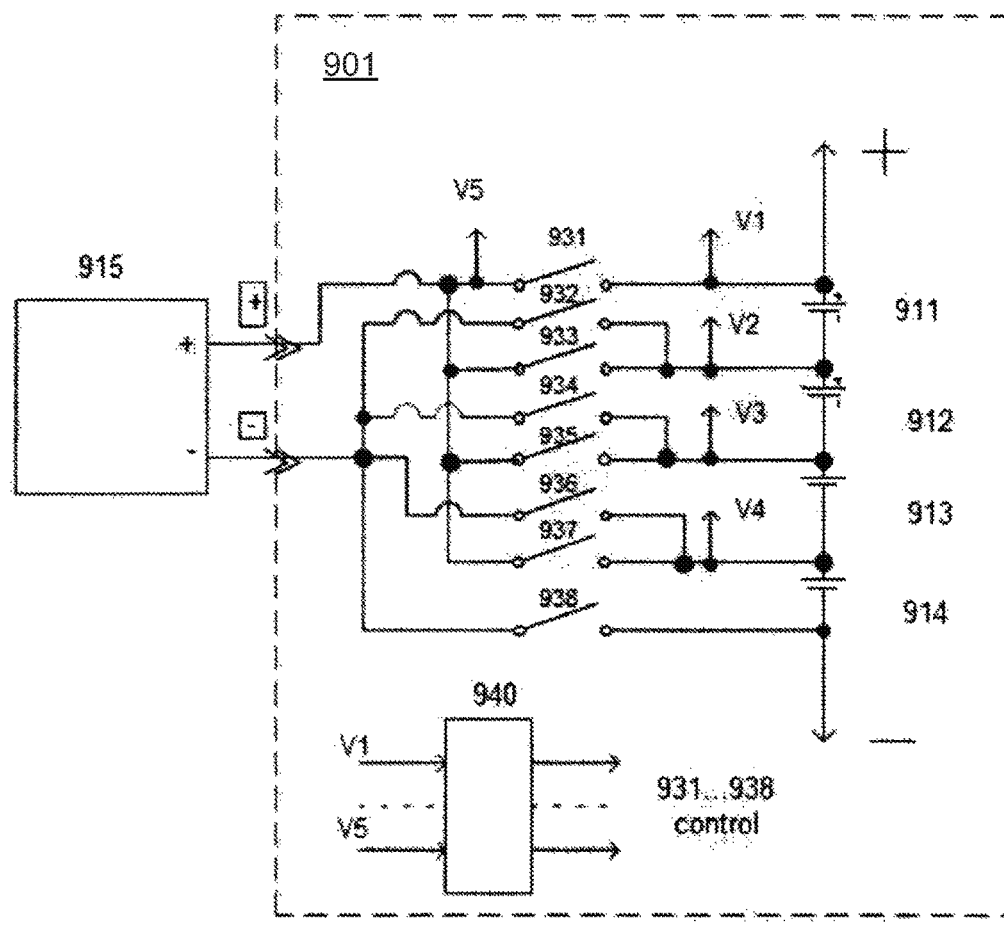
FIG. 9 illustrates an energy juggling circuit for a four-core battery using an external power supply.

FIG. 9 is a schematic diagram of an exemplary energy juggling circuit for a four cells MCB. Cells 911 to 914 in MCB 901 are charged from external power supply 915 via switches 931 to 938 controlled by microcontroller 940. Voltages and currents for cells 911 to 914 are measured and communicated to microcontroller 940. Monitoring of only voltages may be sufficient in some cases. Based on the recorded history of measurement results and/or the most recently measured values, microcontroller 940 decides the timing, shape and amplitude for the charging pulses for each battery cell. Each cell is charged for a period of time (Tcharge) followed by a time rest (Tpause). During (Tpause1) corresponding to the rest time of battery cell 911, the other battery cells 912, 913, 914 are charged. For battery cell 911, $$T\text{pause1} = T\text{charge2} + T\text{charge3} + T\text{charge4} + T\text{add}$$

Figure 10:
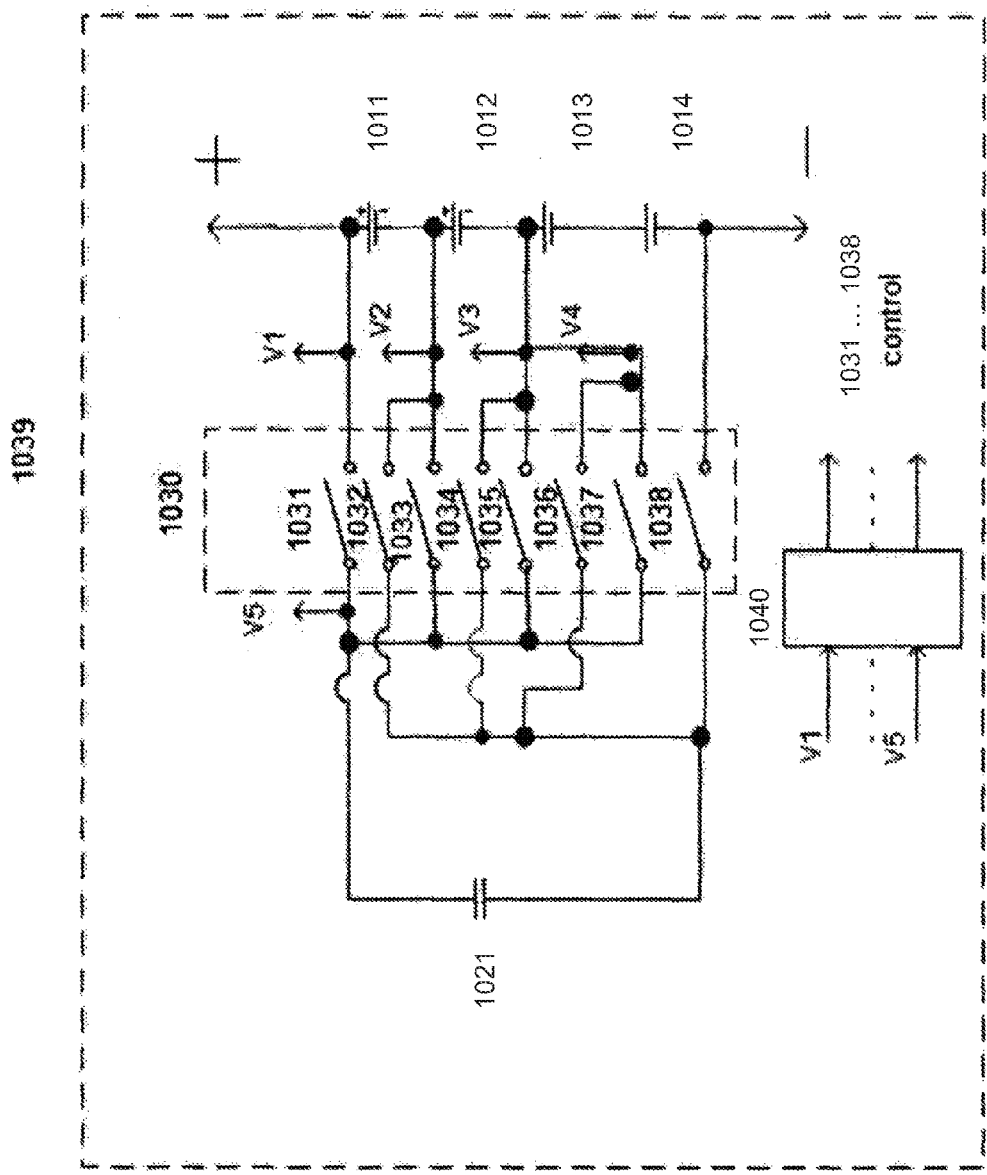
FIG. 10 illustrates an exemplary energy juggling circuit for a four core MCB that uses a capacitor.

Tadd is an optional additional time if the battery, or a group of cells, needs extra time to relax after absorbing the energy delivered by the charging pulse. Microcontroller 940 may change as required the values of Tcharge1 to Tcharge4 and Tadd according to the actual state-of-charge and health status of each battery, as well as its history of charging/discharging cycles FIG. 10 illustrates an exemplary energy juggling circuit for a four core MCB that uses a capacitor. MCB 1039 includes capacitor 1021, switch array 1030, controller 1040 and battery cells 1011 to 1014. Capacitor 1021 is charged from selected battery cells 1011 to 1014 through switching array 1030 and discharged to selected battery cells 1011 to 1014 through switching array 1030. Switching array 1030 consists of switches 1031 to 1038. When discharging capacitor 1021, in some embodiments, capacitor 1021 is connected in series with at least one of cells 1011 to 1014 by switching array 1030, such that the combined voltage of the series combination is higher than the voltage of the cell selected for charging. The configuration of switching array 1030 is controlled by controller 1040. Controller 1040 receives as inputs measurements of the cell voltages (shown as V1, V2, V3 and V4 in FIG. 10). Although capacitor 1021 is shown as internal to MCB 1039 in other embodiments capacitor 1021 is an external capacitor.

In another embodiment, a DC/DC converter is used to develop the charging voltage. In this embodiment, there is no need for a storage device such as capacitor 1021 to connect in series with another battery cell to create the charging voltage. When the DC/DC converter is used, one battery cell may be connected to another battery cell via the DC/DC converter without using an intermediary energy storage device. The DC/DC converter can be controlled to provide the necessary higher charging voltage.

Figure 11:
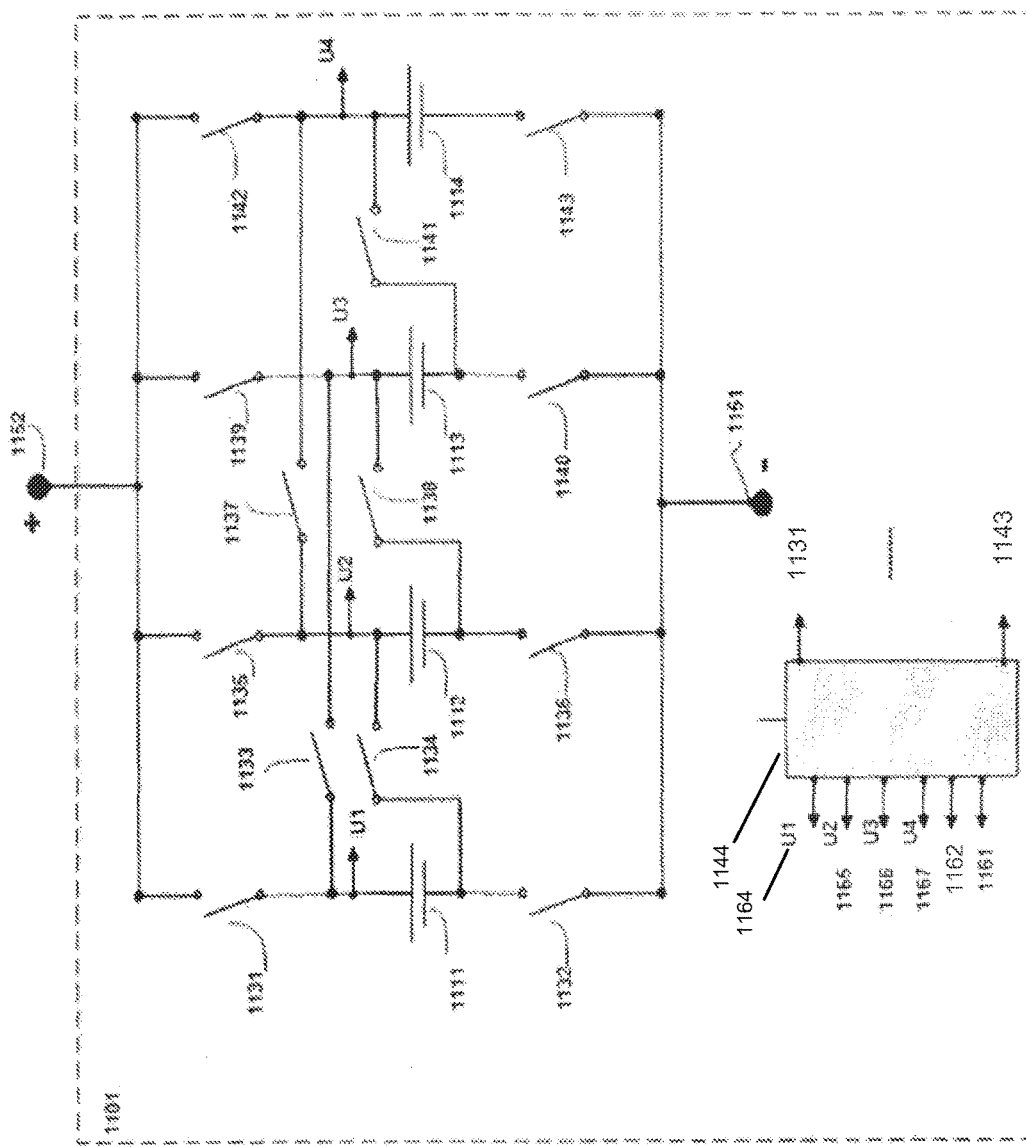
FIG. 11 is a schematic diagram of a variable voltage MCB.

FIG. 11 is a schematic diagram of a variable voltage MCB. MCB 1101 includes battery cells 1111 to 1114, switches 1131 to 1143, controller 1144 and output terminals 1151 and 1152. Controller 1144 includes a smart load communication bus 1161, a temperature input 1162 and voltage inputs 1164 to 1167. In this embodiment battery cells 1111 to 1114 exchange current pulses between each other. Switches 1131 to 1143 allow individual battery cells 1111 to 1114 to be connected in series or in parallel, or to form groups of battery cells. For example, when switches 1131, 1134, 1138, 1141 and 1143 are ON and all other switches are OFF, battery cells 1111 to 1114 are connected in series. In the situation that battery cells 1111 to 1114 are Lithium ion battery cells equally charged to a voltage of 4.2V, the battery can deliver a voltage of 16.8V between output terminals 1151 and 1152. By switching switches 1131, 1134 and 1136 ON and keeping all other switches OFF, the battery cells 1111 and 1112 are connected in series. This provides 8.4V voltage between the output connectors 1151 and 1152.

Table 1 shows output voltages and output currents corresponding to different switching configurations. Variable voltage MCB 1101 may communicate with a smart load (not shown) equipped with an MCB controller via smart load communication bus 1161. When the smart load controller requests a particular voltage or current, the MCB will dynamically self-reconfigure to satisfy the request. Such a variable voltage MCB has the advantage of eliminating a DC-DC voltage converter when a load requires a variable output voltage.

Figure 12:
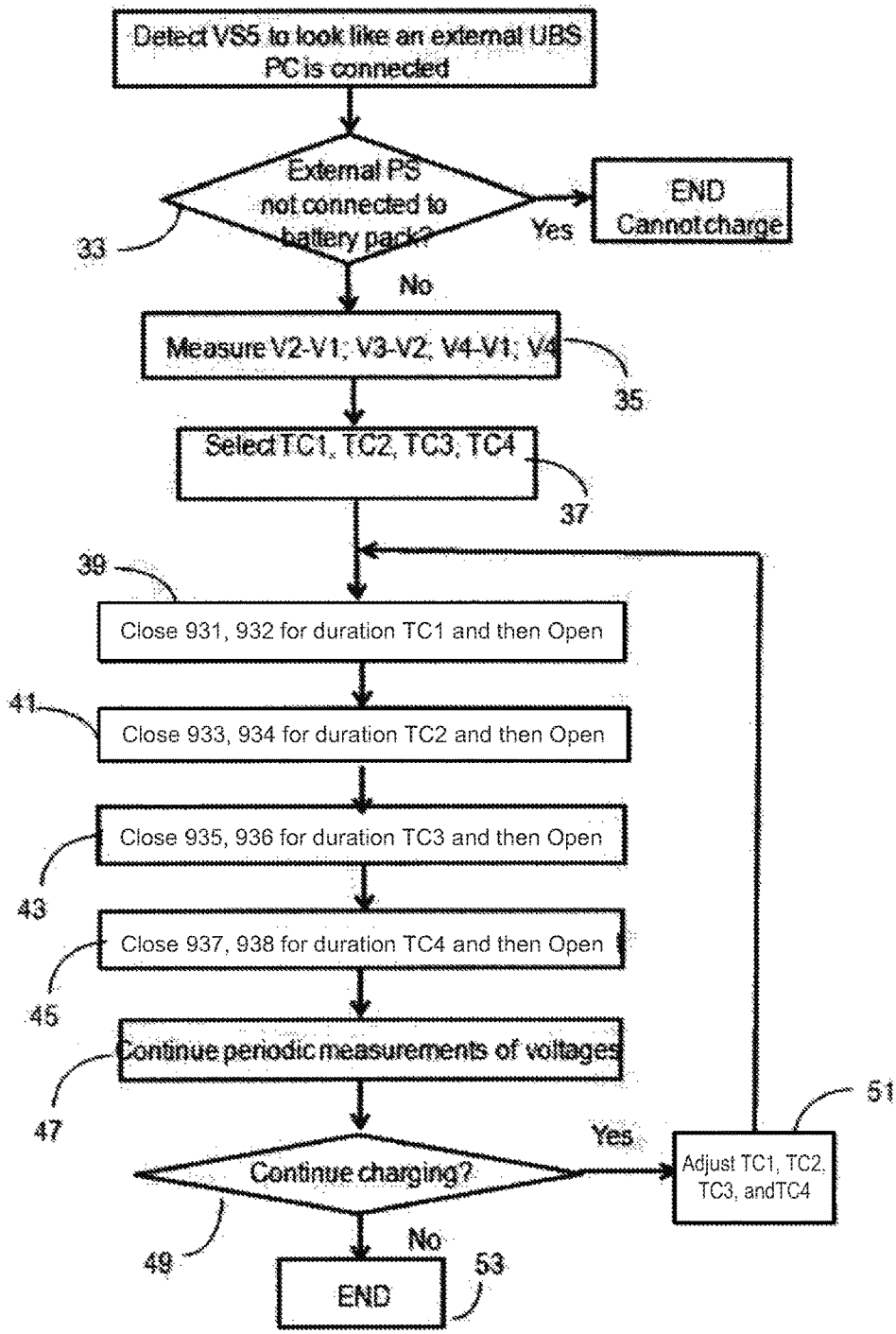
FIG. 12 is a flow diagram of an exemplary pulse charging sequence of the MCB of FIG. 9.

FIG. 12 is a flow diagram of an exemplary pulse charging sequence of the MCB of FIG. 9. Pulse charging of the four cell MCB 901 uses external power supply 915. At step 33 it is determined whether external power supply 915 is coupled to MCB 901. If it is not coupled, then pulse charging is not possible, shown by branch 'Yes' of decision block 33. If an external power supply is coupled, the process moves to step 35. At step 35 voltages V1 to V4 are measured and voltage differences V2−V1, V3−V2, V4−V1 are determined and compared with historical cell voltage measurements. At step 37, the charging time periods for cells 911, 912, 913 and 914 (TC1, TC2, TC3, TC4 respectively) are calculated. At step 39, switches 931 and 932 are closed for a period TC1 and then opened after TC1 finishes. All other switches remain open. Next, at step 41, switches 933 and 934 are closed for a period TC2. At the end of TC2, 933 and 934 are immediately open. All other switches remain open. At step 43, switches 935 and 936 are closed for a period TC3, and then open at the end of TC3. All other switches remain open. Thereafter, at step 45, switches 937 and 938 are closed for a period TC4 At the end of TC4 switches 937 and 938 are opened. All other switches remain open. Voltages V1 to V5 are measured continuously in the meantime, as shown at 47. At step 49, it is determined if the charging should continue. If it is determined that charging should not continue the process stops, at step 53. If it is determined that the charging should continue, the periods TC1, TC2, TC3 and TC4 are adjusted based on the current measurements in step 51 and the process returns to step 39

Figure 13:
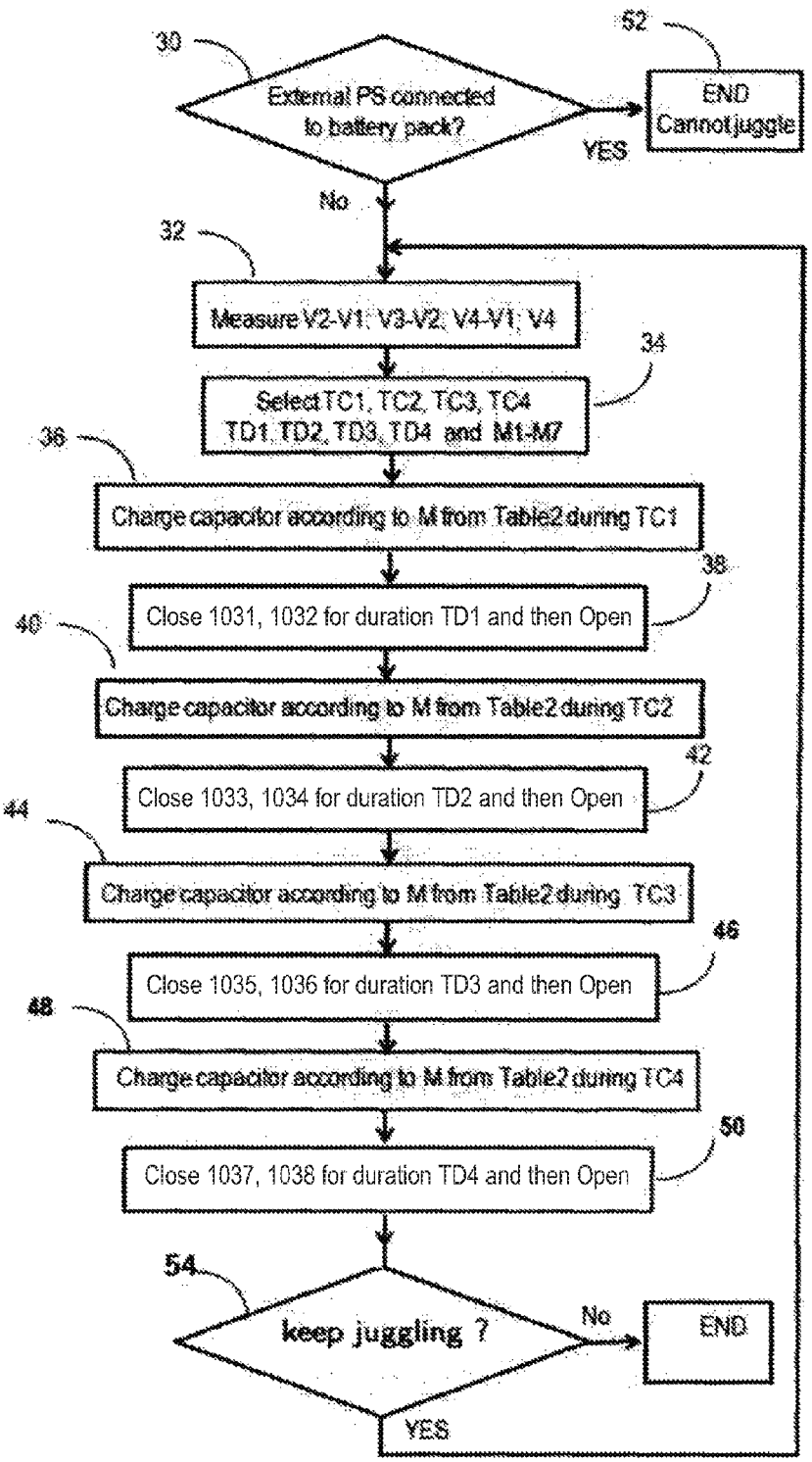
FIG. 13 is a flow diagram of an example pulse charging process of the four cell battery used in the circuit of FIG. 10.

FIG. 13 is a flow diagram of an example energy juggling process of the four cell battery used in the circuit of FIG. 10. At step 30 it is determined whether an external charger is coupled to MCB 1039. If a charger is coupled, no energy juggling takes place and the process ends at 52. If an external power supply not is coupled to MCB 1039, voltages V1 to V4 are measured and voltage differences V2-V1, V3-V2, V4-V1 are determined and compared with the historical values at step 32. Charge pulse durations for TC1, TC2, TC3, TC4 and discharge pulse durations TD1, TD2, TD3 and TD4 respectively for energy juggling are computed at step 34. A capacitor charging mode is also chosen from the possible capacitor charging modes M1 . . . M7 shown in Table 2 below. Capacitor 1021 is charged according to the selected capacitor charging mode M, at step 36, during TC1. The capacitor charging mode and duration determines the voltage that capacitor 1021 is charged to.

At step 38, switches 1031 and 1032 are closed for a period TD1, charging cell 1011 from capacitor 1021. Switches 1031 and 1032 are immediately opened at the end of TD1. At step 40, capacitor 1021 is charged according to the selected capacitor charging mode for period TC2. Next, at step 42, switches 1033 and 1034 are closed for a period TD2 charging cell 1012 and then immediately opened at the end of TD2.

Capacitor 1021 is now charged according to the selected mode at step 44, during TC3. At step 46, switches 1035 and 1036 are closed for a period TD3 charging cell 1033 and immediately opened at the end of TD3. Capacitor 1021 is again charged, this time according to the selected mode at step 48, during TC4. At step 50, switches 1037 and 1038 are closed for a period TD4 charging cell 1034 and then immediately opened at the end of TD4. Based on a voltage measurements, it is decided at step 54 if energy juggling should continue. If yes, the process returns to step 32. If no further energy juggling is needed, the process stops at step 52.

Table 2 shows the position of the switches for various modes M1-7, where '1' means that the respective switch is closed, '0' means that the switch is open.

TABLE 2

| | 1031 | 1032 | 1033 | 1034 | 1035 | 1036 | 1037 | 1038 |
|---|---|---|---|---|---|---|---|---|
| M7 | 1 | 0 | 1 | 0 | 0 | 0 | 0 | 0 |
| M6 | 1 | 0 | 0 | 0 | 1 | 0 | 0 | 0 |
| M5 | 1 | 0 | 0 | 0 | 0 | 0 | 1 | 0 |
| M4 | 1 | 0 | 0 | 0 | 0 | 0 | 0 | 1 |
| M3 | 0 | 0 | 1 | 0 | 0 | 0 | 0 | 1 |
| M2 | 0 | 0 | 0 | 0 | 1 | 0 | 0 | 1 |
| M1 | 0 | 0 | 0 | 0 | 0 | 0 | 1 | 1 |

The number of battery cells is variable and is not limited to the examples described above. In large battery groups, individual battery cells may perform charging while other groups, or individual battery cells, are relaxing, and the remaining groups, or individual battery cells, are performing energy juggling.

In some cases energy juggling might be combined with battery charging. When combined, energy juggling may be performed for battery cells, or groups of battery cells, or batteries, not currently involved in the battery charging process. The energy juggling process may be performed while some battery cells of battery are in a relaxing period.

A similar approach may be used when the MCB delivers energy to an external load. In such a case, some individual battery cell, or group of cells, or batteries, may be connected to the load, while other battery cells, or groups, or batteries, are relaxing, and the remaining battery cells, or groups of cells, or batteries, are performing energy juggling. Relaxation time may be adjusted or even eliminated.

Energy juggling is applicable also to embodiments where the MCB contains battery cores of different shapes and sizes that are to be assembled in a desired overall shape having pre-designed dimensions. The physical differences of the cores leading to differences in their performance characteristics are compensated by controlled variable charging/discharging pulses, including pulse periods, the number of cores placed in the receiving groups and the delivery groups, during the energy juggling process.

Another embodiment of the MCB uses different batteries, or groups of batteries, placed at different locations within the electrical system. The energy juggling mechanism is now adjusted according to the specifics of each battery corresponding to its actual location. Same approach applies during the charging/discharging cycles.

Practical Applications

The methods described next are also applicable to batteries that must permanently be in a full state-of-charge for optimal operation.

It has been determined by experimentation that Li-ion batteries have an optimal charge level called 'vacation level'. When a Li-ion battery is stored at this charge level, minimum losses relative to its capacity are noted for long periods of time. For example, it is not recommended to store a Lithium-ion battery at a charge level below 15% from its nominal capacity for a long time. Conversely, if stored fully charged, the Li-ion battery quickly loses its charge storage capacity. Energy juggling can prevent unnecessary energy losses and significantly improves the lifetime of a Lithium-ion battery even when it is stored fully charged.

In some circumstances it may be important to keep a battery at full capacity for an extended period of time. For example, a battery used as a power back-up is required to deliver the full capacity at any moment of time. Therefore, for greatest portion of its working life this type of battery is fully charged. In this case, energy juggling may be performed using a short cycle pulse charging/discharging using a load and a charger. The load may be a 10 W, 1Ω resistor. The battery is discharged by several millivolts (mV) only in this embodiment of energy juggling. The voltage of the battery should be preferably monitored and the timing for pulse discharging/charging adjusted according to the measured voltage after each charging/discharging cycle, the voltage under load and the dynamics of voltage dropping under load. Charging may be performed through an USB power supply, via computer controlled solid state relay. The power supply voltage could be different from regular USB Vbus value, for example any value from 4.3V to 8 V. Other types of relays could be used, not limited to solid state relays. A reed relay would be beneficial because of high endurance and low voltage drop values. Regular signal or power relays may also be used.

Energy juggling may be done periodically or randomly. During the energy juggling process the energy may be transferred between all battery cells of a battery and in some cases the transfer may be performed from a battery cell with lower energy to a battery cell with higher stored energy level. The duration and periodicity of such energy loss prevention operations depends on the overall state-of-charge of the MCB, the state-of-charge of each battery core, battery temperature, battery age, optimal battery efficiency, desired battery self-discharge rate, etc.

Energy juggling also allows the MCB to be recharged to a range of different charge levels without affecting the battery's calendar lifetime and overall health status.

Energy juggling should be distinguished from cell leveling. Cell leveling is performed to maintain all cells in an MCB at an equal state of charge. Energy is always transferred from battery cells with higher amounts of stored energy to battery cells with lower amounts of stored energy. This transfer is usually done during battery charging and in some cases during battery discharging.

The energy juggling mechanism transfers energy between cells of an MCB periodically, during battery storage, or battery charging, or battery discharging. Unlike cell leveling, energy juggling intentional creates time varying differences between the state of charge of cells in an MCB. In the case of a single cell battery energy is moved back and forth between the cell and a temporary energy storage device.

In some embodiments energy juggling is combined with the cell leveling. However there are some situations where cell leveling is not desirable. For example, some battery cells in an MCB may be kept as reserve cells and purposely kept at long term vacation levels, different from the charge levels of working cells.

Capacity Restoration Based on Pulse Charge/Discharge

Battery capacity is equal to the total time a battery can deliver energy to a known load, (within prescribed current value limits) multiplied by the current. As such, the battery capacity is expressed in ampere hour (Ah) and is usually tested by connecting the battery to the load and measuring the time from start until the battery voltage reaches the low voltage threshold.

Testing the capacity restoration (recovery) of rechargeable battery is now described. A Sony Ericsson BST-33 battery with serial number 766135SWKFLT was used for the test. The previously number of cycles undergone for this battery was unknown. Estimated calendar age of the battery was around 5 years. During first capacity measurement test the battery has shown capacity of 150 mAh instead of the rated value of 900 mAh.

Experiment #1—Lifetime Recovery

One of the experiments used for recharging a battery comprises two phases. During a first phase, a constant current of 0.5 A was applied to the battery until it reached a 4.2V level. For Li-ion batteries 3.7V is considered the standard voltage, while 4.2V the maximum recommended voltage. During a second phase of charging a constant voltage of 4.2 V was maintained until the charging current decreased to 0.01 A. At this point the battery was disconnected from charger for a 10 minutes resting period, followed by a discharge at constant current of 0.5 A until the battery reached 3.0V level, which is the lowest voltage reached by the tested batteries. The battery was kept in idle state for a second resting period of 10 minutes. The above steps were repeated three times, and the maximum capacity of 900 mAh was recorded.

Experiment #2

In another experiment, a battery was connected to an external USB power supply via a solid state relay controlled by a computer. Computer based software performed a series of charging pulse cycles. The relay was kept in ON state for 3 sec and OFF state for 12 sec. The solid state relay with ON resistance of 250 mΩ was used. The battery voltage was measured after each 12 sec OFF period. The ON/OFF cycles where repeated until the battery voltage reached 4.2V at the end of 12 s OFF period. After this the battery was kept in idle state for 10 minutes of resting period. Its voltage was measured at the end of the resting period. If measured voltage was below 4.2V, another series of above described charge pulse cycles was performed until reaching the next resting period. Reaching of 5 resting periods was allowed. The battery pulse-discharging mode was initiated after a maximum of 5 resting periods.

Battery pulse-discharging was started after a 10 min resting period. Discharging current was kept at 1 A level. Discharge ON time was 2 seconds, and discharge OFF time was 6 seconds. Pulse discharging was stopped after battery wattage reached 3V level. Battery was kept in idle state for 10 min before performing any other testing step. The total elapsed discharge ON time was considered to be the measured battery capacity value.

After performing of four such charge/discharge cycles, the battery delivered 850 mAh. A number of 100 pulse charge/discharge cycles have been performed with battery under test. The measured capacity was between 850 and 950 milli-Ah without showing any degradation.

Experiment #3

It has been determined experimentally that the capacity of an aged Li-ion battery, i.e. a battery with substantially reduced capacity and reduced performance characteristics may be restored if the battery which was containing a charge to a voltage Vinitial between 3V and 4.2V periodically performs following steps:

(a) the battery is pulse discharged to a voltage lower than the Vinitial by several millivolts (mV) and the total discharged energy is recorded, and thereafter, (b) the battery is pulse charged with approximately same energy amount back.

The recorded energy amount discharged from and charged back to the battery is maintained at the same level and as such, the battery is maintained at approximately the same voltage level Vinitial after each pulse charging/discharging cycle.

Same treatment may be applied to new batteries. In this case, the battery capacity and performance do not deteriorate for a long period even when the battery is charged to the nominal voltage and exposed to a high temperature, i.e. +55° C. The period during which the battery was fully charged and exposed to high temperatures was 5 month, equivalent of 5 to 6 years of calendar life. The battery capacity was not fading during the entire period of testing.

Experiment #4

This testing was done with a battery charged from a USB power supply, 3 sec ON and 12 sec Off. The battery was discharged through a solid state relay to a 3 Ohm load, 2 sec ON and 6 sec OFF. The solid state relay has 250 mΩ in ON state.

This test shows that when an aged battery with faded capacity is pulse charged and pulse discharged multiple times, its capacity is restored and the battery remains stable for a large number of subsequent pulse charge/discharge cycles. Such a large number of subsequent charge/discharge cycles is not expected, since the battery had exceeded both its calendar lifetime and its cycle life.

Experiment #5

The methods described herein may be used for controlled variable voltage MCB. Variable voltage MCB can use different reconfiguration/charging strategies depending on the available battery charger. An intelligent MCB will reconfigure itself according to an optimal mode, matching the available charger voltage/current.

For example, an electric power tool is equipped with a controller and a controlled voltage MCB. The tool controller communicates with the MCB controller to request the presently needed voltage and current as well as the voltage/current needed in the nearest future. The variable voltage MCB can supply power as requested. The result is a high efficiency for the power tool providing a longer working time compared to a regular power tool.

Another way in which the controlled variable voltage MCB may be used is for electric vehicles. Use of the methods of recharging provided here, allows the vehicle to achieve a higher efficiency and a longer driving range for the same amount of energy stored in the battery. Such controlled variable voltage MCB has an extended calendar life, without significant degradation of its capacity.

What is claimed is:

1. A method in a battery system comprising a plurality of battery cores, the method comprising:
receiving a pulse sequence of two or more pulses; and
transferring energy from at least a first battery core of the battery system to at least a second battery core of the battery system in accordance with the pulse sequence and only when the first and second battery cores are not supplying power to an external load, wherein at least one parameter of the pulse sequence is determined based on at least one parameter of the first battery core and/or the second battery core, including: a charging current, a discharging current, a cell voltage, an internal impedance, and a number of charge/discharge cycles.

2. The method of claim 1, wherein the at least one parameter of the pulse sequence is selected from a group consisting of: a duration of at least one of the pulses, a shape of at least one of the pulses, and a spacing between at least a pair of the pulses.

3. The method of claim 1, further comprising obtaining a measurement of at least one parameter of the battery system, and wherein the at least one parameter of the pulse sequence is based on the measurement.

4. The method of claim 3, wherein the measurement is obtained in real-time.

5. The method of claim 1, wherein a pulse in the pulse sequence is preceded or followed by another pulse of reverse polarity.

6. The method of claim 1, wherein the energy transfer occurs periodically or at random intervals.

7. The method of claim 1, further comprising transferring energy from the first battery core to the second battery core while other battery cores in the battery system are being charged or supplying power to the external load.

8. The method of claim 1, wherein the energy transfer is between a first group of battery cores in the battery system, which comprises the first battery core, and a second group of battery cores in the battery system, which comprises the second battery core.

9. The method of claim 1, wherein the energy transfer is between a first group of battery cores in the battery system, which comprises the first battery core, and a combination of a second group of battery cores in the battery system, which comprises the second battery core and a passive energy storage device.

10. The method of claim 9, wherein the passive energy storage device is internal to the battery system.

11. The method of claim 1, wherein the energy transfer occurs for each of the plurality of battery cores during a respective time slot.

12. The method of claim 11, wherein a duration of the respective time slot is dependent on at least one of: a state of the corresponding battery core, an energy demand of the external load, at least one static parameter of the battery system, and at least one operational parameter of the battery system.

13. The method of claim 1, wherein the battery system is operatively associated with a plurality of switches, and wherein the plurality of switches are operable to reconfigure the plurality of battery cores of the battery system into different configurations of connected battery cores, including series-connected battery cores, parallel-connected battery cores, and combinations of series-connected and parallel-connected battery cores.

14. The method of claim 13, further comprising selecting a given configuration of the connected battery cores based on the external load.

15. The method of claim 13, wherein the plurality of battery cores of the battery system discharge into the external load, individually or in groups of battery cores according to a pre-established rotation pattern.

16. The method of claim 13, further comprising transferring energy to a given configuration of the connected battery cores depending on a battery charger applied to the battery system.

17. The method of claim 1, wherein the second battery core is maintained around a vacation level charge when the second battery core is not being used to supply power to the external load, and wherein the vacation level charge is a level of charge at which a battery core may be safely stored for a long period without significant degradation in its capacity.

18. A battery system, comprising:
one or more battery cores; and
a controller system operative to:
receive a pulse sequence of two or more pulses; and
transfer energy from at least a first battery core of the battery system to at least a second battery core of the battery system in accordance with the pulse sequence and only when the first and second battery cores are not supplying power to an external load, wherein at least one parameter of the pulse sequence is determined based on at least one parameter of the first battery core and/or the second battery core, including: a charging current, a discharging current, a cell voltage, an internal impedance, and a number of charge/discharge cycles.

19. The battery system of claim 18, further comprising one or more sensors communicatively coupled to the controller system, wherein the one or more sensors are configured to obtain a real-time measurement of at least one parameter of the battery system, and wherein the at least one parameter of the pulse sequence is based on the measurement.

20. The battery system of claim 18, further comprising a plurality of switches communicatively coupled to associated drive circuitry within the controller system, wherein the plurality of switches are operable to reconfigure the one or more battery cores of the battery system into different configurations of connected battery cores to transfer energy between the one or more battery cores, including series-connected battery cores, parallel-connected battery cores, and combinations of series-connected and parallel-connected battery cores.

21. The battery system of claim 20, wherein a configuration of the connected battery cores of the battery system is based on at least one of a pre-established rotation pattern, the external load, and a battery charger applied to the battery system.

22. A controller system for a battery system comprising one or more battery cores, the controller system comprising:
a memory having stored thereon processing instructions; and
a processing unit to process the processing instructions to:
receive a pulse sequence of two or more pulses; and
transfer energy from at least a first battery core of the battery system to at least a second battery core of the battery system in accordance with the pulse sequence and only when the first and second battery cores are not supplying power to an external load, wherein at least one parameter of the pulse sequence is determined based on at least one parameter of the first battery core and/or the second battery core, including: a charging current, a discharging current, a cell voltage, an internal impedance, and a number of charge/discharge cycles.

23. The method of claim 1, wherein energy stored in the first battery core is less than energy stored in the second battery core.

24. The battery system of claim 18, wherein energy stored in the first battery core is less than energy stored in the second battery core.

25. The controller system of claim 22, wherein energy stored in the first battery core is less than energy stored in the second battery core.

26. A method in a battery system comprising a plurality of cores, the method comprising:
receiving a pulse sequence of two or more pulses; and
transferring energy in accordance with the pulse sequence from a first battery core of the battery system to a second battery core of the battery system that has more energy stored therein than in the first battery core, the transferring occurring only when both the first battery core and the second battery core are not supplying power to an external load or being charged.

* * * * *